US008504823B2

(12) United States Patent
Carpenter et al.

(10) Patent No.: US 8,504,823 B2
(45) Date of Patent: Aug. 6, 2013

(54) DYNAMIC CONFIGURATION OF CONNECTORS FOR SYSTEM-LEVEL COMMUNICATIONS

(75) Inventors: Todd L. Carpenter, Monroe, WA (US);
Andras Tantos, Bellevue, WA (US);
John Chiloyan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 12/826,551

(22) Filed: Jun. 29, 2010

(65) Prior Publication Data
US 2011/0126005 A1 May 26, 2011

Related U.S. Application Data

(60) Provisional application No. 61/324,236, filed on Apr. 14, 2010, provisional application No. 61/264,206, filed on Nov. 24, 2009.

(51) Int. Cl.
*G06F 13/10* (2006.01)
(52) U.S. Cl.
USPC ................................ 713/158; 710/11; 710/8
(58) Field of Classification Search
USPC ........................................................ 713/158
See application file for complete search history.

(56) References Cited

U.S. PATENT DOCUMENTS

| 4,680,732 | A | 7/1987 | Dicenzo |
| 4,972,470 | A | 11/1990 | Farago |
| 4,991,085 | A | 2/1991 | Pleva et al. |
| 5,101,481 | A | 3/1992 | Anger et al. |
| 5,289,580 | A | 2/1994 | Latif et al. |
| 5,436,857 | A | 7/1995 | Nelson et al. |
| 5,526,037 | A | 6/1996 | Cortjens et al. |
| 5,574,859 | A | 11/1996 | Yeh |
| 5,608,608 | A | 3/1997 | Flint et al. |
| 5,615,344 | A | 3/1997 | Corder |
| 5,649,128 | A | 7/1997 | Hartley |
| 5,668,419 | A | 9/1997 | Oktay |
| 5,738,534 | A | 4/1998 | Ingles et al. |

(Continued)

FOREIGN PATENT DOCUMENTS
WO  WO 2009-154040  12/2009

OTHER PUBLICATIONS

International Search Report and Written Opinion issued in PCT/US2010/057915, mailed Jul. 28, 2011, pp. 1-11.

(Continued)

*Primary Examiner* — Haresh N Patel
(74) *Attorney, Agent, or Firm* — Klarquist Sparkman, LLP

(57) ABSTRACT

A host device comprises a configurable connector. The host device connector can be connected to a configurable connector of an accessory device. The host device can select connector functions to be enabled for connecting to the accessory device connector. The selection of connector functions can be based on accessory device information such as accessory device power consumption, power configuration and application information. The accessory device can exclude connector functions supported by the accessory device from the list of accessory device functions sent to the host device. The accessory device can exclude connector functions based on information about the host and connector devices. Single or mutual authentication can be performed before connection functions are enabled at either device. Host and accessory devices can require that a host device be licensed to use an accessory device connector function or to gain access to accessory device resources. Tiered licensing policies can be supported.

18 Claims, 20 Drawing Sheets

U.S. PATENT DOCUMENTS

| | | | |
|---|---|---|---|
| 5,812,798 A | 9/1998 | Moyer et al. | |
| 5,832,244 A | 11/1998 | Jolley et al. | |
| 5,909,464 A | 6/1999 | Cohen et al. | |
| 5,999,952 A | 12/1999 | Jenkins et al. | |
| 6,029,183 A | 2/2000 | Jenkins et al. | |
| 6,053,763 A | 4/2000 | Brennan et al. | |
| 6,138,177 A | 10/2000 | Williams et al. | |
| 6,148,398 A | 11/2000 | Chang | |
| 6,154,010 A * | 11/2000 | Geiger | 320/137 |
| 6,189,052 B1 | 2/2001 | Nilsson et al. | |
| 6,215,704 B1 | 4/2001 | Shimizu | |
| 6,477,611 B1 | 11/2002 | Chang | |
| 6,561,845 B2 | 5/2003 | Ocheltree et al. | |
| 6,581,098 B1 | 6/2003 | Kumpf et al. | |
| 6,675,237 B1 | 1/2004 | Asaad et al. | |
| 6,687,775 B1 | 2/2004 | Bassett | |
| 6,690,268 B2 | 2/2004 | Schofield et al. | |
| 6,754,671 B2 | 6/2004 | Hrebejk et al. | |
| 6,825,689 B1 | 11/2004 | Snyder | |
| 6,883,050 B1 | 4/2005 | Safadi | |
| 6,939,177 B2 | 9/2005 | Kato et al. | |
| 6,961,790 B2 | 11/2005 | Swope | |
| 6,985,877 B1 | 1/2006 | Hayward et al. | |
| 6,990,549 B2 | 1/2006 | Main et al. | |
| 7,001,201 B1 | 2/2006 | Peng | |
| 7,043,568 B1 | 5/2006 | Klingman | |
| 7,089,466 B2 | 8/2006 | Odom et al. | |
| 7,096,298 B2 | 8/2006 | Morrow et al. | |
| 7,109,745 B2 | 9/2006 | Mulligan | |
| 7,174,371 B2 | 2/2007 | Elo et al. | |
| 7,287,112 B1 | 10/2007 | Pleis et al. | |
| 7,305,253 B2 | 12/2007 | Snyder et al. | |
| 7,424,312 B2 | 9/2008 | Pinder et al. | |
| 7,477,247 B2 * | 1/2009 | Yee | 345/213 |
| 7,496,702 B2 | 2/2009 | Haines | |
| 7,516,211 B1 | 4/2009 | Gourlay et al. | |
| 7,536,497 B2 * | 5/2009 | Jang et al. | 710/316 |
| 7,558,900 B2 | 7/2009 | Jigour et al. | |
| 7,631,265 B1 | 12/2009 | Quinn et al. | |
| 7,649,949 B2 | 1/2010 | Williams et al. | |
| 7,689,783 B2 | 3/2010 | Hofstee et al. | |
| 7,716,400 B2 | 5/2010 | Raines | |
| 7,725,612 B2 | 5/2010 | Boehm et al. | |
| 7,762,818 B2 | 7/2010 | Hoang | |
| 7,769,939 B2 * | 8/2010 | Zhou et al. | 710/303 |
| 7,779,185 B2 * | 8/2010 | Schubert et al. | 710/105 |
| 7,823,214 B2 * | 10/2010 | Rubinstein et al. | 726/34 |
| 7,865,629 B1 | 1/2011 | Tantos et al. | 710/11 |
| 8,050,714 B2 * | 11/2011 | Fadell et al. | 455/557 |
| 8,161,567 B2 * | 4/2012 | Rubinstein et al. | 726/34 |
| 8,195,599 B2 * | 6/2012 | Boddy et al. | 706/62 |
| 8,195,852 B2 * | 6/2012 | Tantos et al. | 710/72 |
| 8,208,853 B2 * | 6/2012 | Lydon et al. | 455/41.2 |
| 8,238,811 B2 * | 8/2012 | Lydon | 455/3.03 |
| 2003/0065863 A1 | 4/2003 | Wyland | |
| 2003/0154291 A1 | 8/2003 | Ocheltree et al. | |
| 2004/0009702 A1 | 1/2004 | Potega | |
| 2005/0005045 A1 | 1/2005 | Kim et al. | |
| 2005/0014531 A1 | 1/2005 | Findikli | |
| 2005/0075133 A1 | 4/2005 | Pinder et al. | |
| 2006/0029094 A1 | 2/2006 | Chen et al. | |
| 2006/0156415 A1 * | 7/2006 | Rubinstein et al. | 726/27 |
| 2006/0181480 A1 * | 8/2006 | Yee | 345/3.1 |
| 2006/0248174 A1 | 11/2006 | Schultz et al. | |
| 2007/0002533 A1 * | 1/2007 | Kogan et al. | 361/686 |
| 2007/0073936 A1 | 3/2007 | Cardenas et al. | |
| 2007/0101039 A1 * | 5/2007 | Rutledge et al. | 710/303 |
| 2007/0226497 A1 | 9/2007 | Taylor | |
| 2007/0233294 A1 * | 10/2007 | Holden et al. | 700/94 |
| 2008/0005424 A1 * | 1/2008 | Raines | 710/62 |
| 2008/0119241 A1 * | 5/2008 | Dorogusker et al. | 455/573 |
| 2008/0126587 A1 | 5/2008 | Dybsetter | |
| 2008/0126660 A1 * | 5/2008 | Zhou et al. | 710/303 |
| 2008/0152305 A1 | 6/2008 | Ziegler | |
| 2008/0201505 A1 | 8/2008 | Monroe | |
| 2008/0263579 A1 * | 10/2008 | Mears et al. | 725/9 |
| 2009/0013095 A1 | 1/2009 | Butcher et al. | |
| 2009/0013097 A1 | 1/2009 | Hsiao et al. | |
| 2009/0023395 A1 * | 1/2009 | Chang et al. | 455/74.1 |
| 2009/0083834 A1 * | 3/2009 | Rubinstein et al. | 726/2 |
| 2009/0108848 A1 | 4/2009 | Lundquist et al. | |
| 2009/0132076 A1 | 5/2009 | Holden et al. | |
| 2009/0156060 A1 | 6/2009 | Hunkins | |
| 2009/0198859 A1 | 8/2009 | Orishko et al. | |
| 2009/0249101 A1 * | 10/2009 | Lydon et al. | 713/323 |
| 2009/0290519 A1 | 11/2009 | Griffin et al. | |
| 2009/0295328 A1 * | 12/2009 | Griffin, Jr. | 320/115 |
| 2009/0315586 A1 | 12/2009 | Swoboda | |
| 2009/0319709 A1 | 12/2009 | Vallius | |
| 2010/0075604 A1 * | 3/2010 | Lydon et al. | 455/41.3 |
| 2010/0076737 A1 * | 3/2010 | Boddy et al. | 703/6 |
| 2010/0084532 A1 * | 4/2010 | Nielsen et al. | 248/346.03 |
| 2010/0085694 A1 * | 4/2010 | Nielsen et al. | 361/679.4 |
| 2010/0085701 A1 * | 4/2010 | Nielsen et al. | 361/679.43 |
| 2010/0138581 A1 * | 6/2010 | Bird et al. | 710/303 |
| 2010/0173673 A1 * | 7/2010 | Lydon | 455/557 |
| 2010/0235552 A1 | 9/2010 | Holden et al. | |
| 2011/0061113 A1 * | 3/2011 | Rubinstein et al. | 726/34 |
| 2011/0125601 A1 * | 5/2011 | Carpenter et al. | 705/26.1 |
| 2011/0125930 A1 * | 5/2011 | Tantos et al. | 710/8 |
| 2011/0126005 A1 * | 5/2011 | Carpenter et al. | 713/158 |
| 2011/0162035 A1 | 6/2011 | King et al. | |
| 2011/0287820 A1 * | 11/2011 | Harrison et al. | 455/575.7 |
| 2012/0102200 A1 | 4/2012 | Rabii | |

OTHER PUBLICATIONS

Compaq et al., "Universal Serial Bus Specification Revision 2.0," Apr. 27, 2000, p. 94, retrieved Aug. 2, 2010, http://polimage.polito.it/~lavagno/esd/usb_20.pdf.

International Search Report issued in PCT/US2011/031033, dated Dec. 29, 2011, 5 pages.

Compaq et al., "Universal Serial Bus Specification Revision 2.0," 3 pp., (document dated Apr. 27, 2000).

"MDWD with Toughbook OT," 1 pp., (document dated Feb. 25, 2002).

* cited by examiner

DYNAMIC CONFIGURATION OF CONNECTORS FOR SYSTEM-LEVEL COMMUNICATIONS

CROSS-REFERENCES TO RELATED APPLICATIONS

This application claims priority to, and the benefit of, U.S. Provisional Application Nos. 61/324,236, filed Apr. 14, 2010, and 61/264,206, filed Nov. 24, 2009, which are both incorporated herein by reference.

FIELD

The present disclosure relates to software protocols for dynamically configuring connectors between electronic devices.

BACKGROUND

Modern computing and mobile devices (smart phones, laptop computers, etc.) should be capable of physically connecting to and communicating with a wide variety of accessory devices (desktop computers, televisions, stereo receivers, etc.). Various communication interfaces are used to connect these devices and the physical connectors associated with the interfaces are usually incompatible. Thus, an electronic device may comprise several physical ports to allow connection to various accessories.

Some physical connectors can support more than one communication interface. Typically, each pin of such connectors supports only one function (data in, data out, clock, etc.) of an interface. Thus, these connectors often have a large pin count and consume extra device real estate, a precious commodity in hand-held devices. These connectors also suffer from low pin utilization if only one interface is used. Thus, the extra space consumed may not be put to efficient use.

To accommodate modifications to existing interfaces or entirely new interfaces, the physical design of a connector can be modified. Redesigned connectors are often incompatible with the previous designs, resulting in older devices unable to communicate with newer ones. Retrofitting a new connector design into existing devices is often difficult as connectors are typically integrated into a device. Thus, older devices may require physical adapters or other specialized hardware to communicate with newer devices. Connectors can be designed with extra pins to allow for future support of new interfaces and functions, but this also increases connector size and the extra pins will remain unused until the new interfaces are developed.

Multiple communication interfaces have been integrated into a single physical connector. For example, the VESA (Video Electronics Standards Association) DisplayPort Interoperability Guideline, Version 1.1a, sets a guideline for enabling interoperability between DisplayPort and other display standards through cable adapters. However, this approach relies on physical adapters to support the physical connection between multiple interfaces. Physical adapters can be more costly and complicate the connection scheme, especially for home users.

Accordingly, there is a need for a flexible and expandable connector that can support multiple communication standards at the system level.

SUMMARY

A connector and method are disclosed that allow for dynamic configuration of a connection between a host device, such as a mobile phone, and an accessory. The connection comprises a connector of a host device connected to a connector of an accessory device. Each connector can be capable of supporting a set of functions, features, interfaces, protocols, etc. The host device can select from a set of mutually supported functions based on information about an accessory device, the host device or a combination of both. Host and accessory device information can include power consumption levels, which applications are currently being executed, how the device is being powered and the like.

Configuration of the connection can be unilateral, in which the host device selects which functions a host-accessory connection is to support, or bilateral, in which both the host and accessory devices participate in function selection. In a bilateral configuration, the accessory device can exclude functions from the list of functions supported by the accessory device that is sent to the host device. The accessory device can exclude functions based on information about the accessory device, the host device, or both devices.

The host device can request that a connected accessory device be authenticated before connector functions are enabled. Additionally, the host device can authenticate an accessory device using certificate-based authentication (e.g., trusted root certificates). Alternatively, a symmetric key (e.g., shared secret) solution can be used. Likewise, the accessory device can authenticate the host device in a similar fashion. Two-way authentication, in which the host and accessory devices authenticate each other, is supported as well.

Host and accessory devices can operate according to various licensing policies to control access to connector functions or device resources. Before allowing a connector function to be enabled, a host or accessory device can require that the host device be licensed to access a specific accessory connector function, or to gain access to accessory device resources. Licenses can be required for a host device to download songs stored at an accessory, print out pages at an accessory printer, or to enable high performance accessory interfaces. Tiered licensing approaches can be supported that allow host device users to purchase more expensive licenses for greater or improved access to resources.

The foregoing and other objects, features and advantages of the invention will become more apparent from the following detailed description, which proceeds with reference to the accompanying Figures.

DETAILED DESCRIPTION

As used in this application and in the claims, the singular forms "a," "an," and "the" include the plural forms unless the context clearly dictates otherwise. Additionally, the term "includes" means "comprises."

The systems, apparatuses and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatuses are not limited to any specific aspect or feature or combinations thereof, nor do the disclosed systems, methods, and apparatuses require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatuses can be used in conjunction with other systems, methods and apparatuses. Additionally, the description sometimes uses terms like "produce" and "provide" to describe the disclosed methods. These terms are high-level abstractions of the actual computer operations that are performed. The actual computer operations that correspond to these terms will vary depending on the particular implementation and are readily discernible by one of ordinary skill in the art.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Figure 1:
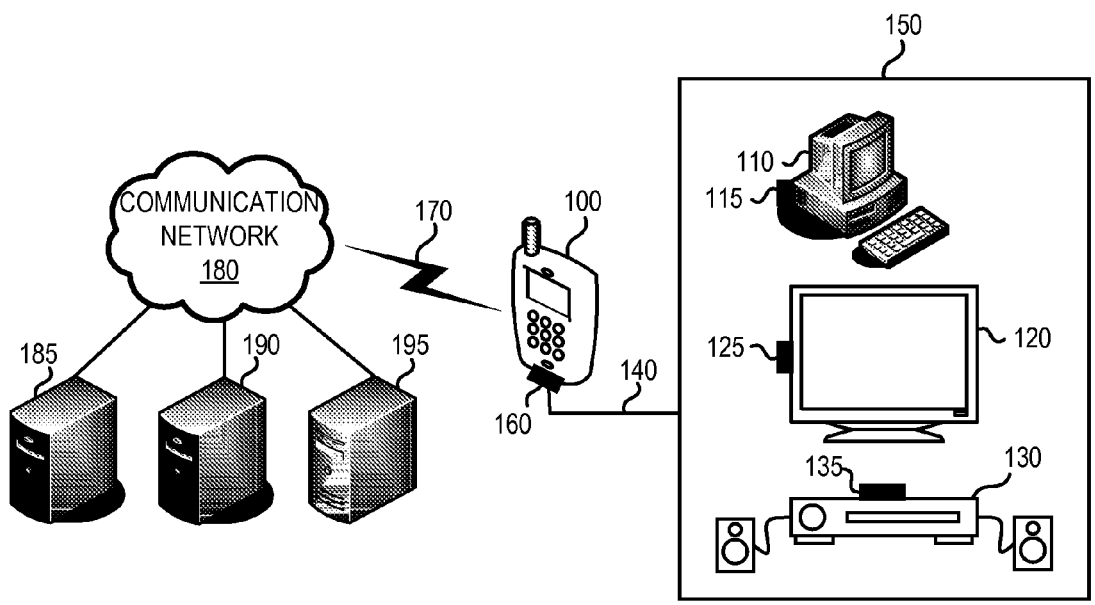
FIG. 1 shows an exemplary mobile host device connected to one of several accessories by a host connector.

Turning now to the drawings, FIG. 1 shows a host mobile device 100 (host), such as a mobile phone, connected to an accessory device (accessory) 150 by a physical connection 140 (e.g., a multi-wire cable). The accessory 150 can be, for example, a personal computer 110, a television 120, an audio player 130 or a mobile device. The physical connection 140 connects a host connector 160 to an accessory connector 115, 125 or 135 integrated into an accessory 110, 120 or 130. The connectors 160, 115, 125 and 135 generally are either male or female and include a grouping of two or more physical pins. The connection 140 can support a wide range of connectors, communication interfaces, protocols, features and functions. For example, the connection 140 can comprise USB (Universal Serial Bus), HDMI (High Definition Multimedia Interface), PCI-Express, DisplayPort, MHL (Mobile High-Definition Link), SATA (Serial ATA) and/or SPDIF (Sony/Philips Digital Interface) connections. The connection 140 can also support mass storage, CD/DVD-ROM, web-cam and HID (Human Interface Device) devices or an FM transmitter. The connection 140 can be as simple as a stereo cable with a built-in FM antenna. The connection 140 can support one or more of these connections, interfaces, features or functions operating concurrently. For example, the connection 140 can simultaneously support both USB 3.0 and HDMI, with separate cables or a single cable providing the physical USB and HDMI connections. In addition, the connection 140 can support additional protocols such as 5.1 audio or Ethernet via tunneling over one or more supported protocols, such as USB or PCI-Express. The terms "function," "features," "interface," "protocol" and "connector" may be used interchangeably and refer to any feature, function, interface, connection, connector, etc. supported by a connection between a host device 100 and an accessory device 150.

Although shown as a mobile phone, the host device 100 can be any type of general computing or mobile device such as a personal computer, media player or personal digital assistant. In general, the host device can be handheld or mobile but the connector described herein can also be used on devices that are typically not handheld or mobile, such as a desktop computer. An accessory 150 can be any device capable of physically connecting to and being electronically coupled with the host device 100. For example, in addition to the accessory personal computer 110, television 120 and audio player 130, the accessory 150 can be a set of headphones, a microphone, an FM antenna or other device.

The terms "host" and "accessory" as used herein indicate a master-slave relationship between connected devices with respect to the discovery of a function set supported by an accessory connector and configuring the capabilities of the host and accessory connectors. As discussed in detail below, the host device is typically the master device. The host device requests information from the accessory device, selects the connector functions to be enabled, and instructs the accessory device to enable the selected connector functions. The accessory device is typically the slave device. The accessory device sends requested information to the host device and configures accessory connector functions in response to instructions received from the host device. Alternatively, a peer-to-peer relationship can be implemented between the host and the accessory.

The host 100 can be connected to a communication network 180 via a communication link 170. The communication link 170 can be a wired or wireless link. The communication network 180 can be a personal area network (PAN), local area network (LAN), the Internet, a cellular or satellite mobile communication network, or any other communication network. The communication configuration shown in FIG. 1 allows users to perform a wide variety of operations. For example, the host device 100 can download or stream media files (audio, video, etc.) provided by servers 185, 190 and 195 for output at an accessory device 150. In another example, the host 100 can download or upload information to the personal computer 110 to synchronize the host 100 with information stored on the computer 110.

Figure 2:
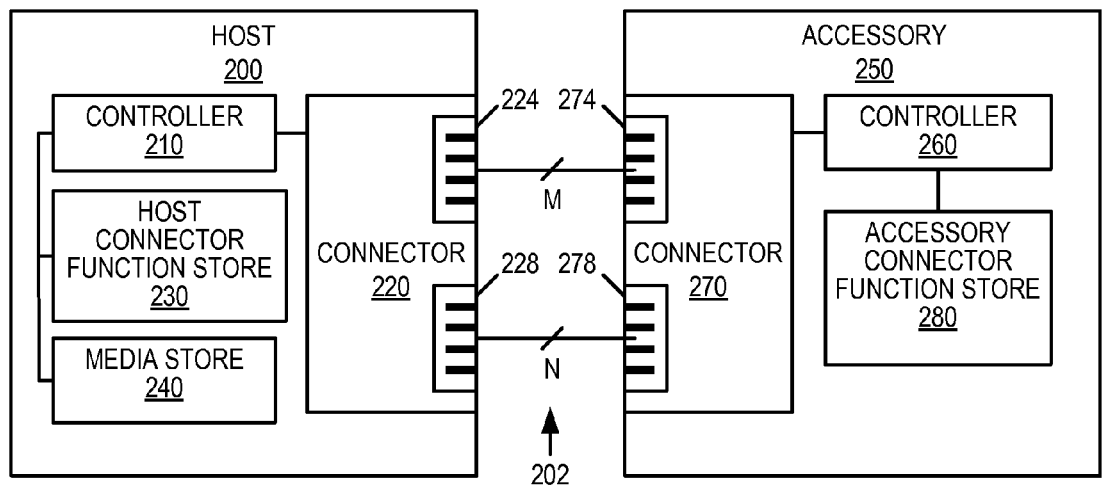
FIG. 2 is a block diagram of an exemplary mobile host device connected to an exemplary accessory device.

FIG. 2 is a block diagram of an exemplary host 200 connected to an exemplary accessory 250 via a cable, shown generally at 202. The host 200 and accessory 250 can be connected by coupling of a host connector 220 and an accessory connector 270. Such couplings can be releasably attachable, such as through cable connections or mating female-/male-type connectors. The host 200 can comprise a controller 210, the host connector 220 and a host connector function store 230. The controller can be any microprocessor or microcontroller, as is known in the art. The host 200 can also comprise a media store 240. The host connector 220 can comprise M fixed-function pins 224 and N multi-function pins 228 where M and N are any integer numbers depending on the particular application. Each of the fixed-function pins 224 can have a dedicated function, such as providing a power or ground connection or hosting the function of a pin of a USB port. The functions supported by the fixed-function pins typically are not changed during operation of the host device. That is, the fixed-function pins are not configurable. Each of the multi-function pins 228 can be configurable and can support more than one function. For example, a multi-function pin can operate as a USB pin in a first configuration, an HDMI pin in a second configuration, and a DisplayPort pin in a third configuration.

The host controller 210 can be coupled to the host connector 220, the host connector function store 230 and the media store 240. The host connector function store 230 stores one or more functions supported by the host connector. Thus, the function store 230 stores a plurality of possible pin configurations that can be dynamically applied to the connector 220 for on the fly pin configurations. The host controller 210 can reference the host connector function store 230 when determining which host connector and accessory connector functions to enable. A function can specify, for example, an interface supported by the host connector (HDMI, DisplayPort, PCI-Express, etc.) and can include a mapping of connector pins to interface pins. For example, a function indicating that the host connector 220 supports HDMI can indicate that host connector pin 13 is configured to operate as the DDC DATA pin, pin 15 is configured to operate as the DDC_CLK pin, etc.

The stored functions can also indicate the functions of fixed-function pins. For example, a stored function can indicate that pin 1 of the host connector 220 can operate as an FM antenna, pin 3 can operate as analog ground, etc. The media store 240 can store one or more media files (audio, video, etc.) that can be communicated across a host-accessory connection. As will be described in detail below, the host controller 210 can select which connector functions can be enabled in a host-accessory connection. The host connector function store 230 and the media store 240 can be memory, such as volatile memory (e.g., registers, cache, RAM), non-volatile memory (e.g., ROM, FPGA, EEPROM, flash memory, etc.) or some combination of the two.

The accessory device 250 comprises a controller 260, a connector 270 and an accessory connector function store 280. The accessory connector 270 can comprise M fixed-function pins 274 and N multi-function pins 278. The host connector fixed-function pins 224 can be connected to the accessory connector fixed-function pins 274, and the host connector multi-function pins 228 can be connected to the accessory connector multi-function pins 278. The pins of the host connector 220 can be arranged such that the fixed-function pins 224 and the multi-function pins 228 are physically interspersed among each other. Alternatively, the fixed-function pins 224 can be physically arranged to be separate from the multi-function pins 228. The pins 274 and 278 of the accessory connector 270 can be similarly arranged. The host and accessory connectors 220 and 270 can comprise one or more physical ports or connectors. For example, the host connector 220 can comprise a micro-USB port comprising a set of fixed-function pins and a second port comprising the remainder of the fixed-functions pins and the multi-function pins. In another example, a connector can comprise a single physical port that includes all of the connector pins.

The accessory controller 260 can be connected to the accessory connector 270 and the accessory connector function store 280. The accessory connector function store 280 can store functions supported by the accessory connector in a manner similar to that described above in regard to the functions stored in the host connector function store 230.

Although the host and accessory devices in FIGS. 1 and 2 are shown as one connector, any of the host or accessory devices described herein can comprise more than one connector. For example, a pass through accessory can be implemented with both a male and female connector. Or, for example, host 200 can comprise multiple connectors 220, allowing the host 200 to simultaneously connect to multiple accessories 250. The host controller 210 can be connected to each of the host connectors. In one embodiment of a host device connected to multiple accessory devices via dynamically configurable connectors, a mobile phone host device can connect to an external speaker system and a personal computer. Similarly, accessory 250 can comprise multiple connectors 270 to allow connection to multiple hosts 200. In one embodiment of an accessory device connected to multiple host devices via multiple dynamically configurable connectors, an accessory television can be connected to multiple host mobile phones.

Figure 3:
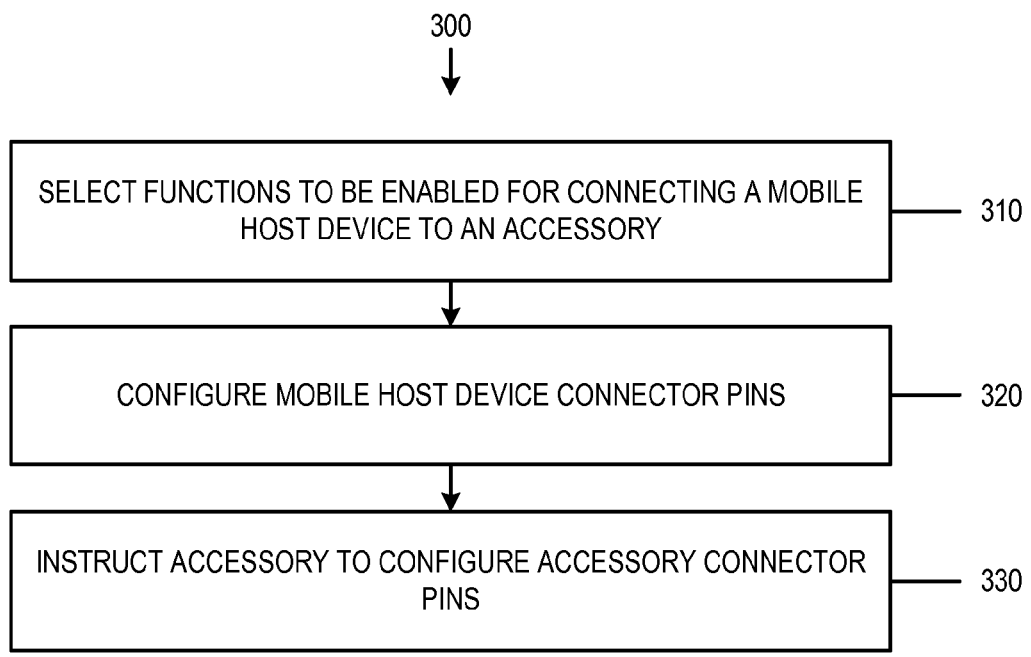
FIG. 3 is a flowchart of a first embodiment of an exemplary method of configuring a mobile host device connector for connecting to an accessory device connector.

FIG. 3 is a flowchart of a first embodiment 300 of an exemplary method of configuring a mobile host device for connecting to an accessory. The host connector can be dynamically configured in response to an accessory being attached to the host device, operations or transactions that are being performed or scheduled to be performed, etc. For example, the method 300 could be executed in response to a mobile player being releasably attached to a television. At 310, the mobile host device can select connector functions to be enabled for connecting a mobile host device to an accessory. Information regarding the accessory connector functions can be received from the accessory or another source, and can be stored at the host device. Such information can be communicated via the fixed pins. Additionally, such information can be received in response to a request from the host device. At 320, the mobile host device can configure pins of the mobile host device connector. For example, configuring the pins can comprise assigning each pin to be configured a pin function associated with one of the selected connector functions. For example, if the mobile host device selects the USB interface to be enabled, configuring the pins can comprise assigning individual host device connector pins to support the DATA−, DATA+, VCC and VDD pin functions of the USB interface. Configuration of the pins can be static (i.e., the pin configuration for a given function can be determined during host and accessory device design and implemented during device manufacture) or the pin configuration can be dynamic. For example, in dynamic pin configuration, during operation of the mobile host device, a first multi-function pin can support the DATA− pin function and a second multi-function pin can support the DATA+ pin function in a pin configuration supporting USB. Connector pin configuration can comprise the host device enabling the selected connector functions. Prior to 320, the host connector can be unconfigured or previously configured. An unconfigured connector can have one or more connector functions disabled or a set of default functions enabled. Pins that are not enabled in a particular configuration can be kept in a high impedance state until configured. Hardware for putting pins into high-impedance mode is well known in the art, such as tri-state gates.

In some embodiments, enabling the selected connector functions comprises, for each of the pins to be configured, configuring the host device such that one of a plurality of host device pin controllers (discussed below in regards to FIG. 4) controls (i.e., transmits and receives signals from) the pin. For example, if pin 13 of the host mobile phone is capable of being controlled by an HDMI DDC DAT pin controller or a PCIEX CLK+ pin controller, the mobile phone can be configured such that the HDMI DDC DAT pin controller controls pin 13. For example, the HDMI DDC DAT pin controller can be enabled and the PCIEX CLK+ pin controller can be disabled, or, if the pin controllers are connected to pin 13 by a switch, the switch can be configured to connect the HDMI DDC DAT controller to pin 13.

At 330, the host device can instruct the accessory device to configure the accessory connector pins to support the selected functions. The mobile host device can instruct the accessory by sending an instruction over the host-accessory connection. This instruction can constitute a "function set" or "mode set" command. The instruction can specify which functions that have been selected by the host device are to be enabled in which pins of the accessory connector. In the example of a media player being connected to a television, after process block 330, the connection can be configured to support HDMI or another multimedia interface. Optionally, the host device can receive acknowledgement or confirmation that the accessory device has successfully enabled the selected accessory connector functions. After configuring the host device connector pins, the host device can load the necessary drivers to support the enabled connector functions. The drivers can be loaded from the host device store 230, or downloaded from a remote resource connected to the host device over a network. In addition, the host device can then inform applications and other devices connected to the host device that the enabled functions are available for use. The host device can then begin appropriate communications over the host-accessory connection using the enabled connection functions.

In other embodiments, the method 300 can further comprise authentication of an accessory. A host device can send an authentication request to the accessory device. In response, the accessory can provide authentication information to the host. The accessory device can send its device class (audio, video, mass storage, human interface device, etc.) and subclass to the host device, along with a digital certificate and/or other authentication information.

One technique for using digital certificates is through the use of a root certificate. A root certificate is either an unsigned public key certificate or a self-signed certificate that identifies the Root Certificate Authority (CA). A root certificate is thus part of a public key infrastructure (PKI) scheme. The most common commercial variety is based on the ITU-T X.509 standard, which normally includes a digital signature from a certificate authority (CA). Other certificate-based authentication schemes can be used. Non-PKI-based solutions such as symmetric key (e.g., shared secret) can be used for authentication.

The host device can attempt to authenticate the accessory device based on the received information. If the host device can authenticate the accessory, the host device can configure the accessory connector. That is, the accessory can enable a set of accessory connector functions in response to receiving a "function set" instruction from the host. The host can request authentication information from accessories having configurable connectors, such as personal computers and mobile devices. Authentication may not be required for certain classes of accessories, depending on the accessories' supported feature set. Authentication can occur over the control channel of the host-accessory connector.

Figure 4:
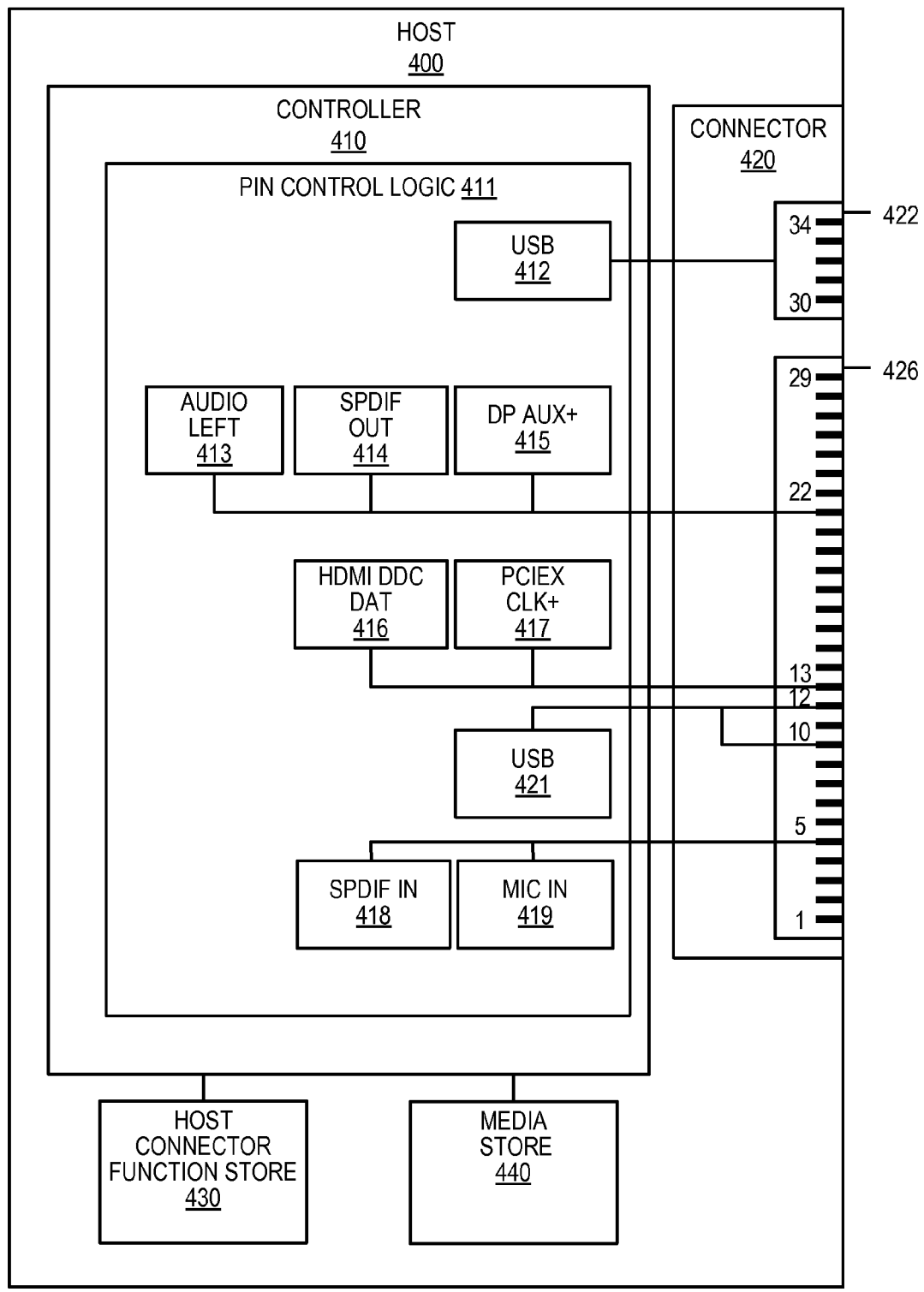
FIG. 4 is a block diagram of an exemplary mobile host device showing several multi-function pins capable of being controlled by multiple pin controllers.

FIG. 4 is a block diagram of an exemplary host device 400 showing several fixed and multi-function pins 426 capable of being controlled by pin controllers 412-419 and 421. The host 400 comprises a controller 410, a connector 420, a host connector function store 430 and a media store 440. The connector 420 comprises 34 pins physically arranged in two different groups. The first group of pins 426 comprises 29 pins (pins 1 through 29) and contains a combination of fixed-function and multi-function pins. The second group of pins 422 comprises five fixed-function pins (pins 30-34) which can be compatible with the micro-USB specification published by the USB Implementers Form (available at http://www.usb.org/). In some embodiments, select pins within the first group of pins 426 can be used to discover the functions supported by an accessory connector connected to the host 400. For example, pins 10 and 12, controlled by USB controller 421, can be used to send a request to a connected accessory for the functions supported by the accessory connector and to receive the response from the accessory. In other embodiments, any other low pin count serial interface such as RS-232 can be used for this functionality. The second group of pins 422 can also be used for monitoring or managing the performance of an accessory device. The received accessory connector functions can be passed from the second group of pins 426 to the controller 410.

The host controller 410 comprises pin control logic 411. The pin control logic 411 comprises pin controllers 412-419 and 421 that provide the functions supported by the multi-function pins. For example, the USB controller 412 controls the second group of pins 422 and provides a micro-USB interface at these pins. No other pin controller connects to fixed-function pins 30-34, as these pins are not configurable.

More than one pin controller can be connected to the multi-function pins. For example, Audio Left, SPDIF OUT and DP AUX+ (DisplayPort Auxiliary Pin (positive)) controllers 413, 414 and 415 are connected to multi-function pin 22. Thus, in this example, pin 22 is capable of supporting any one of three functions. Pin 22 can deliver left-channel analog audio output in a first configuration, operate as the output pin in the SPDIF interface in a second configuration and operate as the auxiliary (positive) pin in the DisplayPort interface in a third configuration. The pin control logic 411 ensures that each multi-function pin is controlled by no more than one pin controller at any given time. In some embodiments, a multiplexer (not shown) or other switch (e.g., tri-state gate) can be used to connect one of the pin controllers to a multi-function pin. In other embodiments, one pin controller connected to a multi-function pin can be enabled and the other pin controllers connected to the multi-function pin can be disabled. The multiplexer or switch can be a component separate from the pin controller 410, or it can be integrated into the controller circuitry. The pin control logic 411 should be configured such that pin controllers that operate concurrently are connected to different multi-function pins. For example, Audio Left and Right controllers should not be connected to the same multi-function pin as these controllers operate concurrently when the stereo analog audio output function is enabled.

Multi-function pins 5 and 13 support multiple functions in a similar manner. HDMI DDC DAT and PCIEX CLK+ controllers 416 and 417 are connected to pin 13 and SPDIF IN and MIC IN controllers 418 and 419 are connected to pin 5. Thus, pin 13 can be configured to operate as the DDC DAT pin of the HDMI interface, or as the CLK+ pin of the PCI Express interface. Pin 5 can be configured to operate as the INPUT pin of the SPDIF interface or as a microphone input pin.

The pin controllers 412-419 and 421 can be related to the multi-function pins by a "many-to-one" relationship. That is, each of the multi-function pins can be configured to support a dedicated set of functions. In the example shown in FIG. 4, pin 22 can operate as the Audio Left, SPDIF OUT or DP AUX+ pins. The pin control logic 411 can comprise duplicate pin controllers for a given function to provide for multiple ports of an interface. For example, connector 420 can support two DisplayPort channels if two sets of DisplayPort controllers can control two independent sets of multi-function pins.

To provide additional flexibility, pin controllers can be related to multi-function pins by a "many-to-many" relationship. In this arrangement, pin controllers can be configured to control more than one multi-function pin. For example, pin control logic 411 can be configured to connect HDMI DDC DAT controller 416 to pin 13 in one configuration, and to another multi-function pin in a second configuration.

The host controller 410 can select the host and accessory connector functions to be enabled. The controller 410 can select the connection functions based on the accessory connector functions received from the accessory device and the host connector functions accessed from the host connector function store 430. The controller 410 can leave one or more host connector functions or accessory connector functions unselected, or, the controller 410 can select all host and accessory connector functions. The selected connector functions are selected from among the host connector functions and the accessory connector functions according to selection criteria. In some embodiments, the selection criteria can be that the selected connector functions are supported by both the host and accessory devices. Thus, the controller 410 can select one or more functions that are mutually supported by the host and accessory connectors to be enabled. In other embodiments, the connector functions can be selected according to different or additional criteria, such as connection function power consumption, function bandwidth, function speed, which applications are currently executing or are scheduled for execution on the host and/or accessory devices, etc. Thus, function selection can comprise performing matching, comparing and/or other operations whose outcomes provide a measure or indication of whether a given connector function is to be selected for enablement at the host and accessory connectors. In some embodiments, the selection, or negotiation, of connector functions to be enabled can be asymmetric. That is, the host device selects which functions are to be enabled. The accessory device does not participate in the selection of which connection functions are to be enabled. The accessory device responds to requests for information from the host device and enables accessory connector functions as instructed by the host device. In other embodiments, the negotiation can be symmetric. That is, both the host and accessory participate in selecting which connector functions are to be enabled. An accessory device can select one or more connector functions to be enabled and can send these functions to the host device. The host controller can then select connector functions to be enabled based in part on the selected connector functions sent by the accessory.

The host controller 410 can also be configured to dynamically reconfigure the host connector 420 depending on the operations being performed or scheduled to be performed by the host 400. For example, if a host 400 is scheduled to synchronize with a personal computer accessory device, a large amount of data can be scheduled to be sent over the host-accessory connection. If the connector can support an interface capable of a higher data transfer rate than any of the connector functions currently enabled, the controller 410 can determine that the higher data rate interface should be enabled. For example, the controller 410 can determine that a USB 3.0 interface should be enabled before the synchronization operation begins. The synchronization operation can then use the newly enabled USB 3.0 interface. In some embodiments, the controller 410 can reconfigure the host connector 420 to restore the previous connector configuration after the sync operation is completed. Alternatively, the controller 410 can be configured to keep the host connector 420 in the new configuration.

The controller 410 can reconfigure the host connector 420 in response to other operations or transactions. For example, the controller 410 can enable a video data interface such as HDMI in response to determining that a current operation involves the transfer of video data across a host-accessory connector, if a video interface is not presently enabled. The controller 410 can determine which connector functions to enable in response to operations performed or scheduled to be performed based on algorithms hard-wired into controller circuitry, controller firmware, software running on the host 400, user settings, or any combination thereof. For example, the user can request an operation through a GUI. In order to carry out the operation, the host connector can be dynamically reconfigured to most effectively communicate with the accessory in response to the user input. For instance, if a user indicates that he or she wishes to play a movie stored on the host mobile device on a connected television, the host device can reconfigure the mobile device-television connection to enable an interface capable of high data transfer rates, or an interface designed for multimedia communication.

A controller of an accessory device as described herein can comprise one or more of the components of the host device controller 410 described above. For example, an accessory device controller can comprise pin control logic. The pin control logic can be capable of transmitting and receiving signals to/from the pins of the accessory device connector using individual pin controllers. The accessory device pin control logic can ensure that each multi-function accessory connector pin is operatively coupled to no more than one pin controller at any given time. In some embodiments, a multiplexer (not shown) or other switch (e.g., tri-state gate) can be used to connect one of the accessory device pin controllers to an accessory connector multi-function pin. In other embodiments, one accessory device pin controller connected to a multi-function pin can be enabled and the other accessory device pin controllers connected to the multi-function pin can be disabled to allow the accessory pin to be controlled by a single pin controller.

Figure 5:
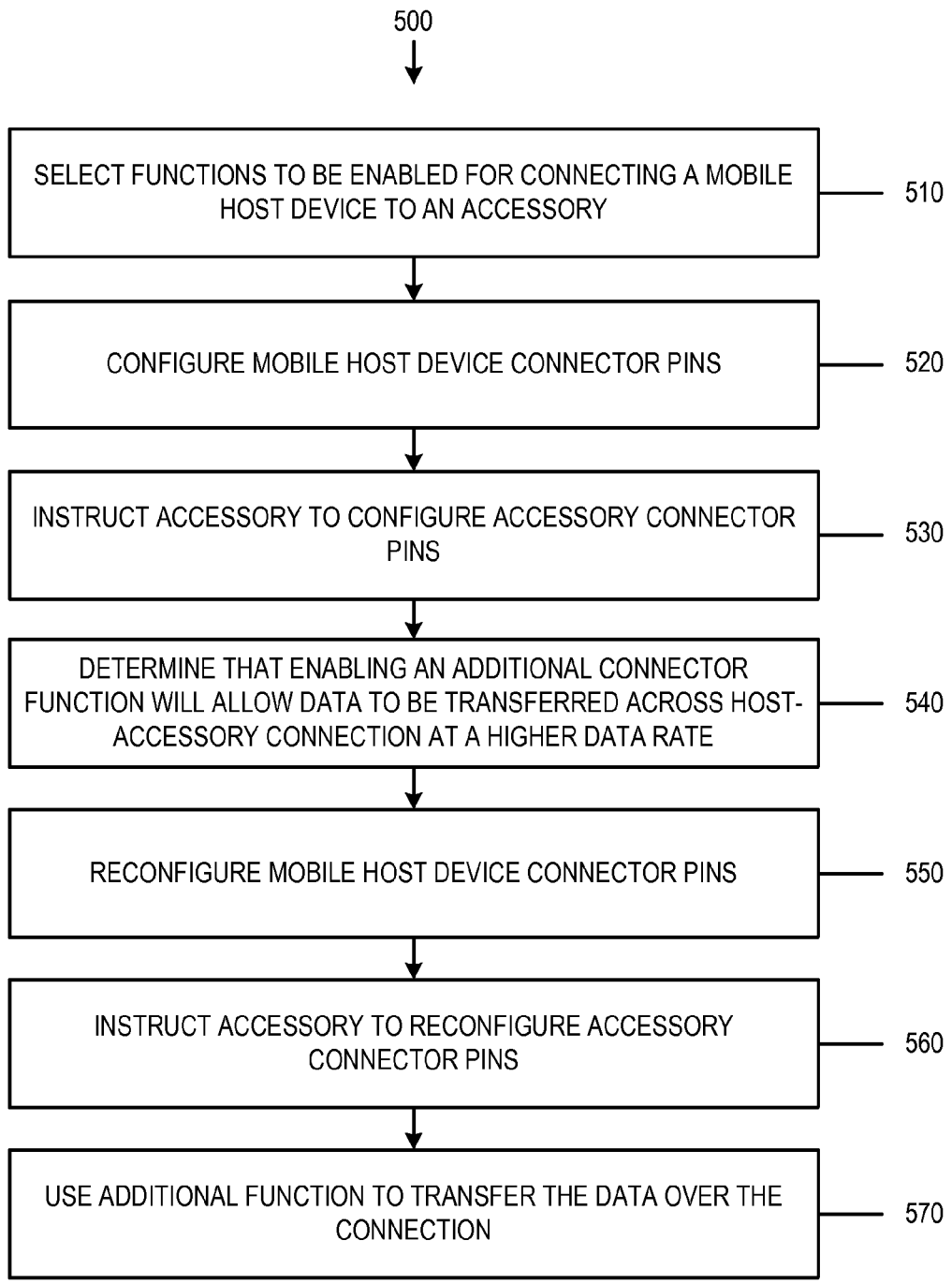
FIG. 5 is a flowchart of an exemplary method of reconfiguring a host connector to enable a high data rate connector function.

FIG. 5 is a flow chart of an exemplary method 500 for reconfiguring a host connector to enable a high data rate function. At 510, one or more functions to be enabled at a host connector and at an accessory connector can be selected. At 520, the one or more selected functions can be enabled at the host connector. At 530, an instruction to enable the one or more selected functions at the accessory connector can be sent to the accessory device. At 540, the host device can determine that an operation currently being performed or scheduled to be performed and involving the transfer of data over the host-accessory connection can be completed in a shorter amount of time by enabling an additional function of the host and accessory connectors not currently enabled. At 550, the additional function can be enabled at the host device connector by reconfiguring the mobile host device connector pins. At 560, an instruction can be sent to the accessory device to enable the additional function at the accessory device connector by reconfiguring the accessory device connector pins. At 570, the additional function can be used to transfer the data over the connection established by the reconfigured host and accessory devices. Thus, the host can monitor performance of enabled connector functions and dynamically reconfigure the host and accessory connectors in response to the monitoring. The reconfiguration can comprise adding or replacing a function to the set of enabled functions. Reconfiguration can take place without disrupting other enabled connector functions. For example, transfer of data can be maintained on some pins while additional functionality is enabled at other pins not being used.

The host controller 410 can be configured to avoid function collision. For example, a globally unique identifier (GUID) can be associated with each supported functionality having a unique pinout. The host controller 410 can be configured to require that mutually supported functions have the same GUID before enabling the function. Consider an example where a host supports HDMI on pins 14-20 and PCI-Express on pins 21-24, and an accessory supports HDMI on pins 18-24. The HDMI functions supported by the host and the accessory can be associated with different GUIDs. The host controller cannot enable the HDMI functions, as they are associated with different GUIDs. Thus, the host controller avoids connecting accessory HDMI pins to host PCI-Express pins. The host controller also avoids connecting accessory HDMI pins to incorrect host HDMI pins.

Figure 6:
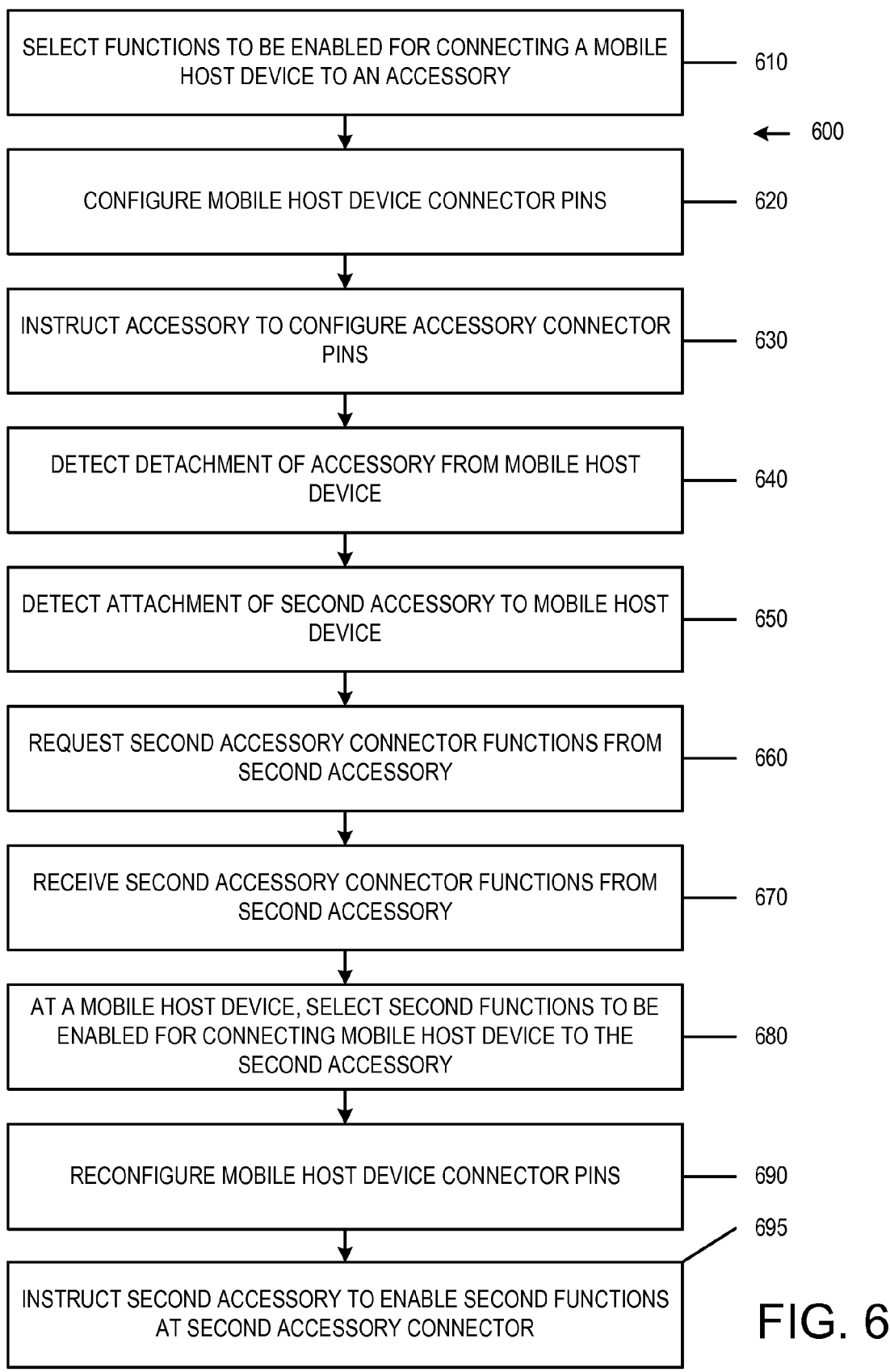
FIG. 6 is a flowchart of an exemplary method of reconfiguring a host connector in response to a second accessory being connected to a mobile host device in place of a first accessory or otherwise being connected to the mobile host device after being disconnected.

FIG. 6 is a flowchart of an exemplary method reconfiguring a host connector in response to a second accessory being connected to a mobile host device in place of a first accessory. For example, method 600 could be executed in response to a user first connecting a mobile phone to a stereo receiver to listen to songs stored on the phone, and then, later, disconnecting the stereo receiver and connecting a television to the phone to watch a movie. At 610, the mobile host device can select one or more first functions to be enabled at a host connector for connecting to an accessory. At 620, the host device can configure the pins of the host connection to support the selected functions. At 630, the host device can instruct the accessory device to configure the accessory connector pins to support the selected functions. At 640, detachment of the accessory from the host device can be automatically detected. For example, some pins can be periodically monitored for connectivity, such as by monitoring the current flow or signal switching. If a predetermined period of inactivity occurs, it can be determined that the accessory has been disconnected. Another technique for automatic detection is to simply look for voltage level changes on pins wherein one state indicates an "attached state" and another an "non-attached" state. At 650, attachment of a second accessory to the host device can be detected. This can be again through monitoring of current or pin activity. It can be assumed that after a disconnect, a new accessory was connected. At 660, the host device can request the second accessory connector functions from the second accessory device. At 670, an indication of one or more functions supported by the second accessory connector can be received from the second accessory. At 680, the host device can select one or more second functions to be enabled at the second accessory connector and the host device connector. At 690, the host device can reconfigure the pins of the host connection to support the selected second functions. At 695, the second accessory device can be instructed to configure the second accessory connector to support the selected second functions. Thus, the host device can automatically and dynamically reconfigure pins based on replacement of a first accessory with a second accessory.

The method 600 can further comprise placing the host connector in an unconfigured or a previously configured state in response to detecting the first accessory device being detached from the host device. The host controller can place the pins into a high-impedance state, enable a default set of connector functions or enable a set of connector function associated with a previous configuration of the host controller.

Figure 7:
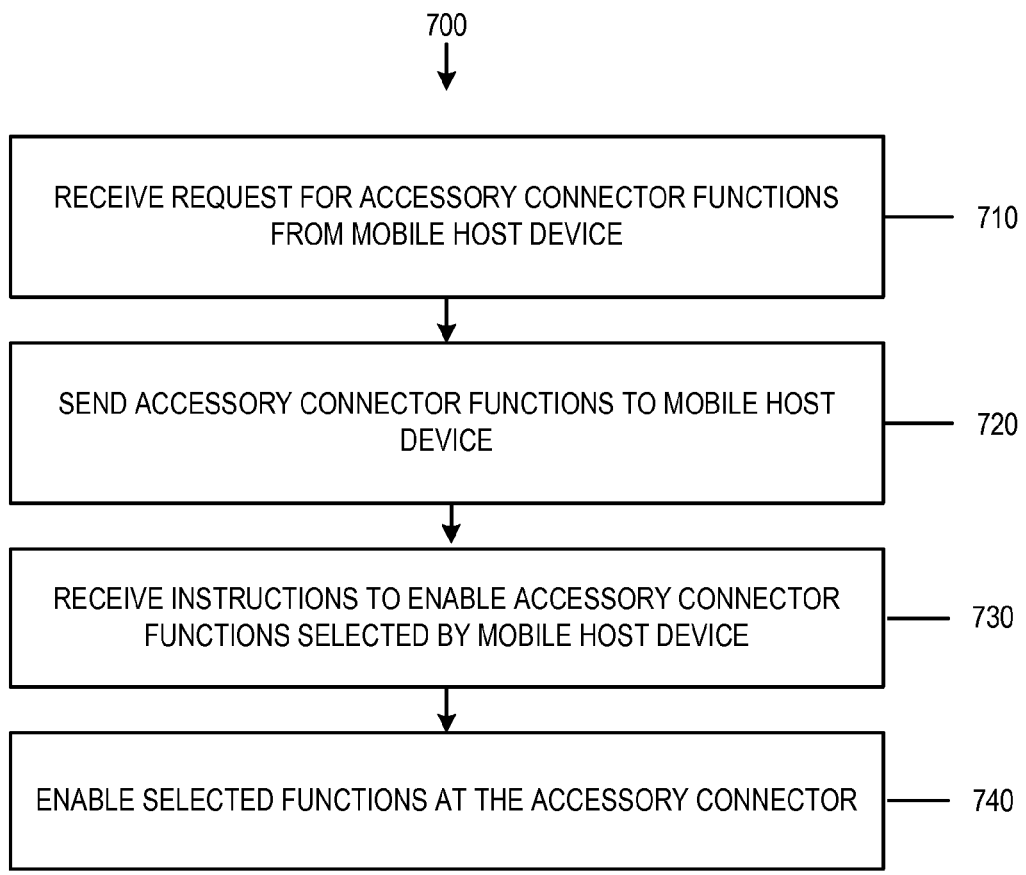
FIG. 7 is a flowchart of a first embodiment of exemplary method of configuring an accessory connector connected to a host connector.

FIG. 7 is a flow chart of a first embodiment 700 of an exemplary method for configuring an accessory connector connected to a host connector. At 710, a request can be received from a host device for the functions supported by the connector of the accessory device. At 720, an indication can be sent from the accessory device to the host device of one or more functions supported by the accessory device connector. At 730, an instruction can be received by the accessory from the host device to enable one or more functions selected by the mobile host device at the connector of the accessory device. At 740, the one or more selected functions can be enabled at the connector of the accessory device. In addition to enabling the selected functions at the specified pins as indicated by received instruction from the host device, the accessory device can set any related hardware or software configurations necessary to enable the appropriate bus traffic across the enabled pins. In some embodiments, enabling the functions at the accessory device connector comprises, for each of the pins to be configured, configuring the accessory device such that one of a plurality of accessory device pin controllers controls the pin. For example, if pin 13 of the accessory device is capable of being controlled by an HDMI DDC DAT pin controller or a PCIEX CLK+ pin controller, the accessory can be configured such that the HDMI DDC DAT pin controller controls pin 13. For example, the HDMI DDC DAT pin controller can be enabled and the PCIEX CLK+ pin controller can be disabled, or, if the pin controllers are connected to pin 13 by a switch, the switch can be configured to connect the HDMI DDC DAT controller to pin 13.

The accessory device can then notify accessory device applications, or other devices connected to the accessory device that the enabled functions are available for use. The accessory device can then begin appropriate communication over the host-accessory connection using the enabled connection functions.

The accessory device connector can be unconfigured or previously configured prior to enabling the one or more selected functions at the accessory device connector. The accessory device can be reconfigured by receiving an instruction to enable additional functions and then enabling the additional functions at the accessory connector. An accessory controller can place the accessory connector in an unconfigured or a previously configured state in response to detecting separation of the accessory from a host. The accessory controller can place the pins into a high-impedance state, enable a default set of connector functions or enable a set of connector functions associated with a previous configuration of the accessory controller.

Table 1 shows an exemplary set of connection configurations for the exemplary 34-pin host connector shown in FIG. 4.

TABLE 1

| Pin | Passive Accessory | HDMI | Display Port, 4 lanes | PCI Express, 2 lanes | Display Port 1 lane, PCI Express, 1 lane | Display Port, 2 lanes, USB 3.0 | MHL, USB 3.0 | Pin type |
|---|---|---|---|---|---|---|---|---|
| 1 | | | | FM_ANT (FM antenna) | | | | F |
| 2 | | | | AUDIO_L (left channel audio) | | | | M |
| 3 | | | | AGND (analog ground) | | | | F |
| 4 | | | | AUDIO_R (right channel audio) | | | | M |
| 5 | MIC_IN | | | MIC_IN/SPDIF_IN | | | | M |
| 6 | | | | PHONE_DET (phone detection) | | | | F |
| 7 | PASS_ACC_DET | | | SPDIF_OUT | | | | M |
| 8 | NC | HDMI_HPD | NC | NC | NC | NC | CTRL | F |
| 9 | | | | POWER_REQ | | | | F |
| 10 | NC | | | HOST_DM | | | | F |
| 11 | | | | GND | | | | F |
| 12 | NC | | | HOST_DP | | | | F |
| 13 | NC | HDMI_DDC_DAT | DP_TXD3n | PCIEX_RCKn | PCIEX_RCKn | USB_RXDn | USB_RXDn | M |
| 14 | | | | GND | | | | F |
| 15 | NC | HDMI_DDC_CLK | DP_TXD3p | PCIEX_RCKp | PCIEX_RCKp | USB_RXDp | USB_RXDp | M |
| 16 | NC | HDMI_TXCN | DP_TXD2n | PCIEX_TXD1n | PCIEX_TXD1n | USB_TXDn | USB_TXDn | M |
| 17 | | | | GND | | | | F |
| 18 | NC | HDMI_TXCP | DP_TXD2p | PCIEX_TXD1p | PCIEX_TXD1p | USB_TXDp | USB_TXDp | M |
| 19 | NC | HDMI_TXD0N | DP_TXD1n | PCIEX_RXD1n | PCIEX_RXD1n | DP_TXD1n | NC | M |
| 20 | | | | GND | | | | F |
| 21 | NC | HDMI_TXD0P | DP_TXD1p | PCIEX_RXD1p | PCIEX_RXD1p | DP_TXD1p | NC | M |
| 22 | NC | HDMI_TXD1N | DP_TXD0n | PCIEX_TXD2n | DP_TXD0n | DP_TXD0n | TXCn | M |
| 23 | | | | GND | | | | F |
| 24 | NC | HDMI_TXD1P | DP_TXD0p | PCIEX_TXD2p | DP_TXD0p | DP_TXD0p | TXCp | M |
| 25 | NC | HDMI_TXD2N | DP_AUXn | PCIEX_RXD2n | DP_AUXn | DP_AUXn | TXDn | M |
| 26 | | | | GND | | | | F |
| 27 | NC | HDMI_TXD2P | DP_AUXp | PCIEX_RXD2p | DP_AUXp | DP_AUXp | TXDp | M |
| 28 | | | | Reserved | | | | F |
| 29 | | | | GND | | | | F |
| 30 | | | | +5 V | | | | F |
| 31 | | | | SYNC_DM | | | | F |
| 32 | | | | SYNC_DP | | | | F |
| 33 | | | | OTG_ID | | | | F |
| 34 | | | | GND | | | | F |

The letters F and M in the Pin Type column mean "fixed-function" and "multi-function," respectively, and the letters "NC" mean, "Not Connected." The individual pins (HDMI_TXD1P, PCIEX_TXD2p, etc.) of the various communication interfaces (USB 3.0, MHL, DisplayPort, PCI-Express, and HDMI) listed in Table 1 are known to those of skill in the art.

As indicated in Table 1, high-speed signal pairs in various interfaces such as the PCIEX_TXDp/n signal pair in PCI-Express and the DP_TXDn/p signal pair in DisplayPort can be routed on the same pins, for example, pins 13 and 15, as these pins are based on similar low-level electrical interface (AC-coupled differential signaling). This allows the corresponding pin controllers to use common interface circuitry and reduces design complexity, and controller area and cost. High-speed interfaces, such as HDMI, can be made compatible with AC-coupled differential interfaces with the use of inexpensive interface converter chips.

An alternative Table 1 can be as follows:

| Connector | Pin | HDMI | DisplayPort, 4 lanes | PCI express, 2 lanes | Display port 1 lane, PCI express 1 lane | Display port 2 lanes, USB 3.0 | MHL, USB 3.0 | Pin type |
|---|---|---|---|---|---|---|---|---|
| Accessory | 1 | | | | FM_ANT | | | fixed |
| | 2 | | | | ACC_POWER | | | multi-function |
| | 3 | | | | AGND | | | gnd |
| | 4 | | | | AUDIO_L/SPDIF_OUT | | | multi-function |
| | 5 | | | | MIC_IN | | | multi-function |
| | 6 | | | | AUDIO_R/SPDIF_IN | | | fixed |
| | 7 | | | | ACC_UART_TX | | | fixed |
| | 8 | | | | ACC_UART_RX | | | fixed |
| | 9 | HDMI_HPD | n.c. | n.c. | n.c. | USB3_VBUS | USB3_VBUS | multi-function |
| | 10 | | | | PHONE_DET | | | multi-function |
| | 11 | | | | GND | | | gnd |
| | 12 | HDMI_UTIL | n.c. | n.c. | n.c. | USB3_DP | USB3_DP | multi-function |
| | 13 | HDMI_DDC_DAT | DP_TXD3n | PCIEX_RCKn | PCIEX_RCKn | USB3_RXDp | USB3_RXDp | multi-function |
| | 14 | HDMI_CEC | n.c. | n.c. | n.c. | USB3_DM | USB3_DM | gnd |
| | 15 | HDMI_DDC_CLK | DP_TXD3p | PCIEX_RCKp | PCIEX_RCKp | USB3_RXDn | USB3_RXDn | multi-function |
| | 16 | | | | GND | | | multi-function |
| | 17 | | | | GND | | | gnd |
| | 18 | HDMI_TXD2P | DP_TXD2n | PCIEX_TXD1n | PCIEX_TXD1n | USB3_TXDp | USB3_TXDp | multi-function |
| | 19 | HDMI_TXD1P | DP_TXD1n | PCIEX_RXD1n | PCIEX_RXD1n | DP_TXD1n | USB3_ID | multi-function |
| | 20 | HDMI_TXD2N | DP_TXD2p | PCIEX_TXD1p | PCIEX_TXD1p | USB3_TXDn | USB3_TXDn | gnd |
| | 21 | HDMI_TXD1N | DP_TXD1p | PCIEX_RXD1p | PCIEX_RXD1p | DP_TXD1p | MHL_CTRL | multi-function |
| | 22 | | | | GND | | | multi-function |
| | 23 | | | | GND | | | gnd |
| | 24 | HDMI_TXD0P | DP_TXD0n | PCIEX_TXD2n | DP_TXD0n | DP_TXD0n | MHL_TXCn | multi-function |
| | 25 | HDMI_TXCP | DP_AUXn | PCIEX_RXD2n | DP_AUXn | DP_AUXn | MHL_TXDn | multi-function |
| | 26 | HDMI_TXD0N | DP_TXD0p | PCIEX_TXD2p | DP_TXD0p | DP_TXD0p | MHL_TXCp | gnd |
| | 27 | HDMI_TXCN | DP_AUXp | PCIEX_RXD2p | DP_AUXp | DP_AUXp | MHL_TXDp | multi-function |
| | 28 | | | | GND | | | power |
| | 29 | | | | GND | | | gnd |
| uUSB | 28 | | | | USB_VBUS | | | power |
| | 29 | | | | USB_DM | | | fixed |
| | 30 | | | | USB_DP | | | fixed |
| | 31 | | | | USB_OTG_ID | | | fixed |
| | 32 | | | | USB_GND | | | gnd |

In the alternative Table 1, the HOST_DP and HOST_DM are replaced by ACC_UART_TX and ACC_UART_RX. This means that the primary accessory communication path, which we use to negotiate features, authenticate, etc. can be changed to a simpler serial communication. The USB port (USB_DP and USB_DM) can also be used to do USB-based accessory communication, if the USB port is changed to host mode on the phone and the accessory supports it.

Figure 8A:
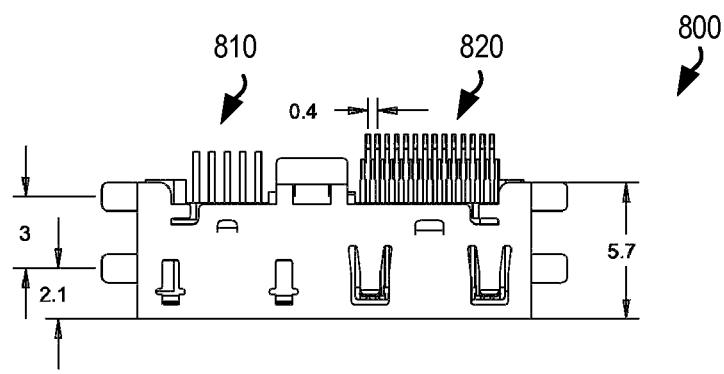
FIG. 8(a) is a top view of an exemplary physical implementation of the host connector of FIG. 4.
Figure 8B:
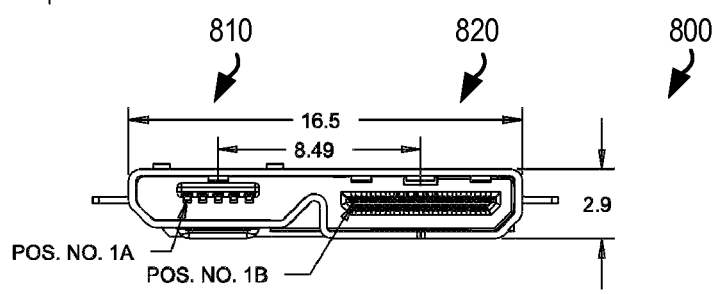
FIG. 8(b) is an end view of an exemplary physical implementation of the host connector of FIG. 4.
Figure 8C:
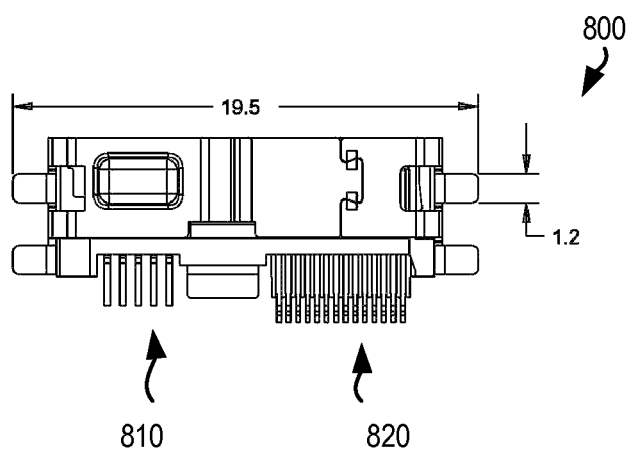
FIG. 8(c) is a bottom view of an exemplary physical implementation of the host connector of FIG. 4.

FIGS. 8(a)-8(c) show top, end and bottom views of an exemplary physical implementation 800 of the host connector 420 of FIG. 4. In this example, the host connector is a single physical connector 800 comprising two physically separate sets of pins 810 and 820. The first group of pins 810 comprises five fixed-function pins and can be used for discovering the accessory connector features. The first group of pins 810 can comprise a USB connection as shown, or any other low pin count serial interface. The second group of pins 820 comprises a combination of 29 fixed-function and multi-function pins. The connector 800 can be integrated into a mobile host device and arranged, for example, at the bottom of the device to allow for a convenient connection to a docking station. The connector 800 can be connected to any wire, cable, docking station, accessory device, etc. having a connector capable of mating with the connector 800.

Figure 9:
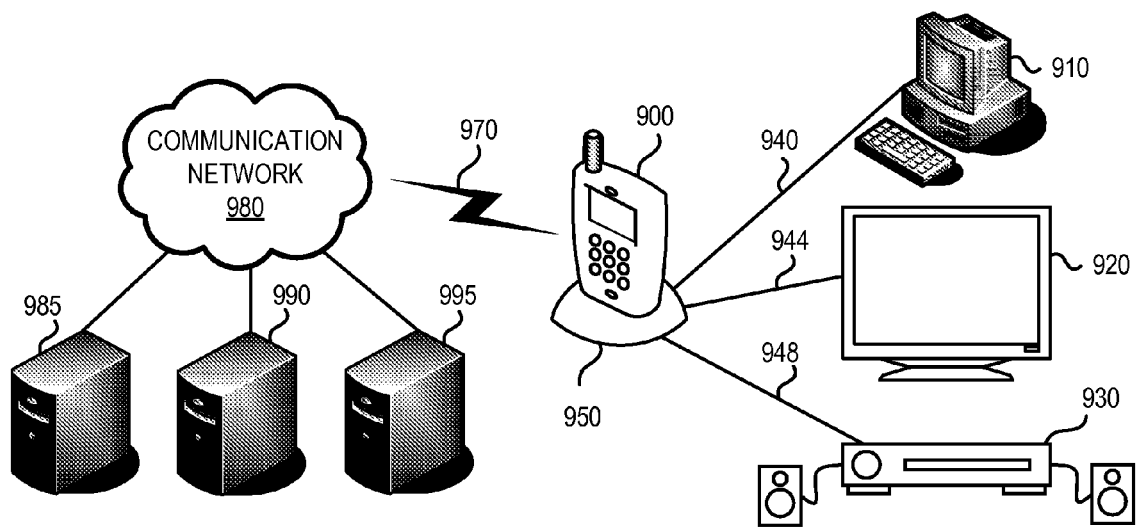
FIG. 9 shows an exemplary mobile host device connected to multiple accessories by a host connector connected to an accessory docking station device.

FIG. 9 shows an exemplary host device 900 connected to multiple accessories 910, 920 and 930 by a docking station device 950. In this configuration, the docking station 950 operates as the accessory device and can have any of the components and functionalities of accessory devices described herein. The docking station 950 can operate as a physical adapter between accessories 910, 920, 930 and the connector of the host 900. Thus, connections 940, 944 and 948 can be cables that conform to existing physical connector standards (mini- or micro-USB or Type A, B, C or D HDMI connectors).

Figure 10:
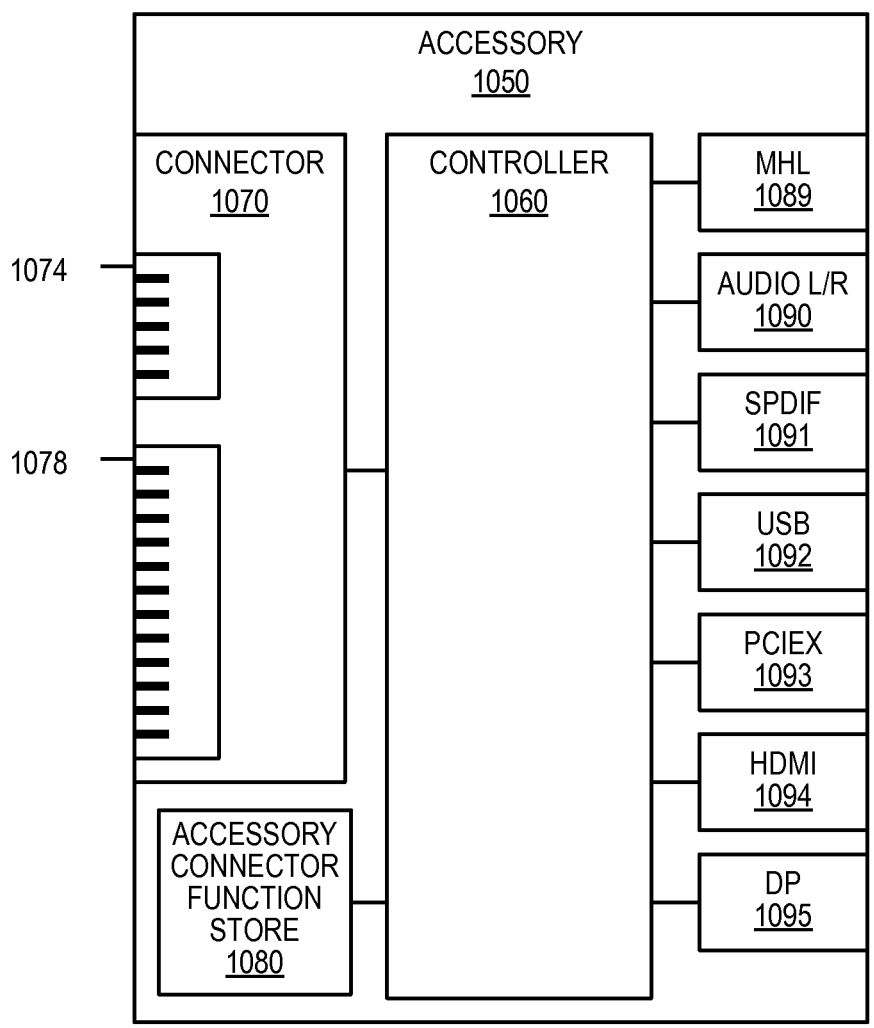
FIG. 10 is a block diagram of an exemplary docking station accessory device capable of connecting to the host connector of FIG. 4.

FIG. 10 shows a block diagram of an exemplary docking station accessory device 1050 capable of connecting to the host connector of FIG. 4. The accessory 1050 comprises a controller 1060, a connector 1070 and an accessory store 1080. The connector 1070 comprises a first group of multi-function pins 1078 and a second group of fixed-function pins 1074. The accessory 1050 also includes a set of physical connectors 1089-1095 that conform to physical connector standards of various communication interfaces. For example, the audio left/right connector 1090 can be a TRS (tip-ring-sleeve) connector and USB connector 1092 can be a micro-USB connector. The accessory 1050 can also comprise an MHL connector 1089, an SPDIF connector 1091, a PCI-Express connector 1093, an HDMI connector 1094 and a DisplayPort connector 1095. Thus, a docking station accessory 1050 can allow multiple accessories to connect to a host connector without requiring a physical redesign of the accessory connectors. The multiple accessories can be connected to the accessory 1050 by the connectors 1089-1095 either one at a time or simultaneously. The accessory 1050 can be viewed as a switch, routing data from the accessory connector 1070 to one or more of the connectors 1089-1095, depending on the enabled functions of the accessory connector 1050.

Figure 11:
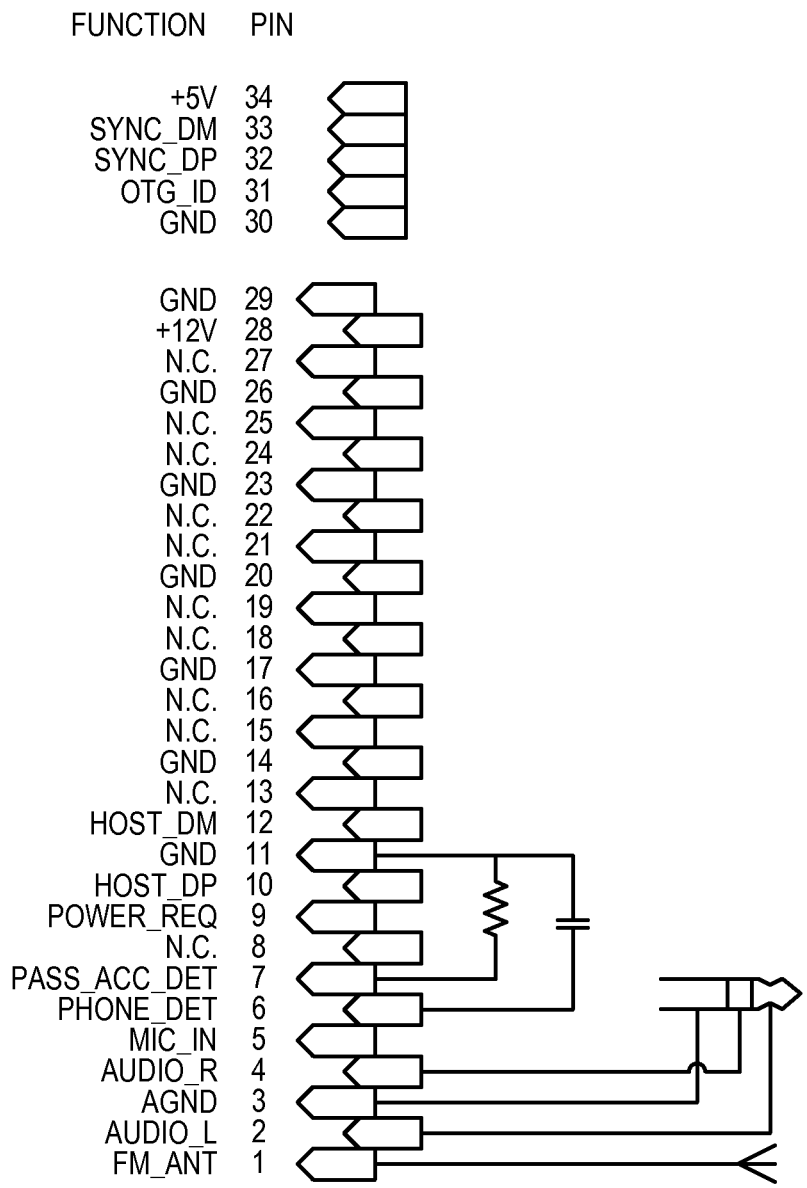
FIG. 11 is a schematic diagram of a stereo cable accessory with built-in FM antenna connected to the exemplary host connector of FIG. 4.
Figure 12:
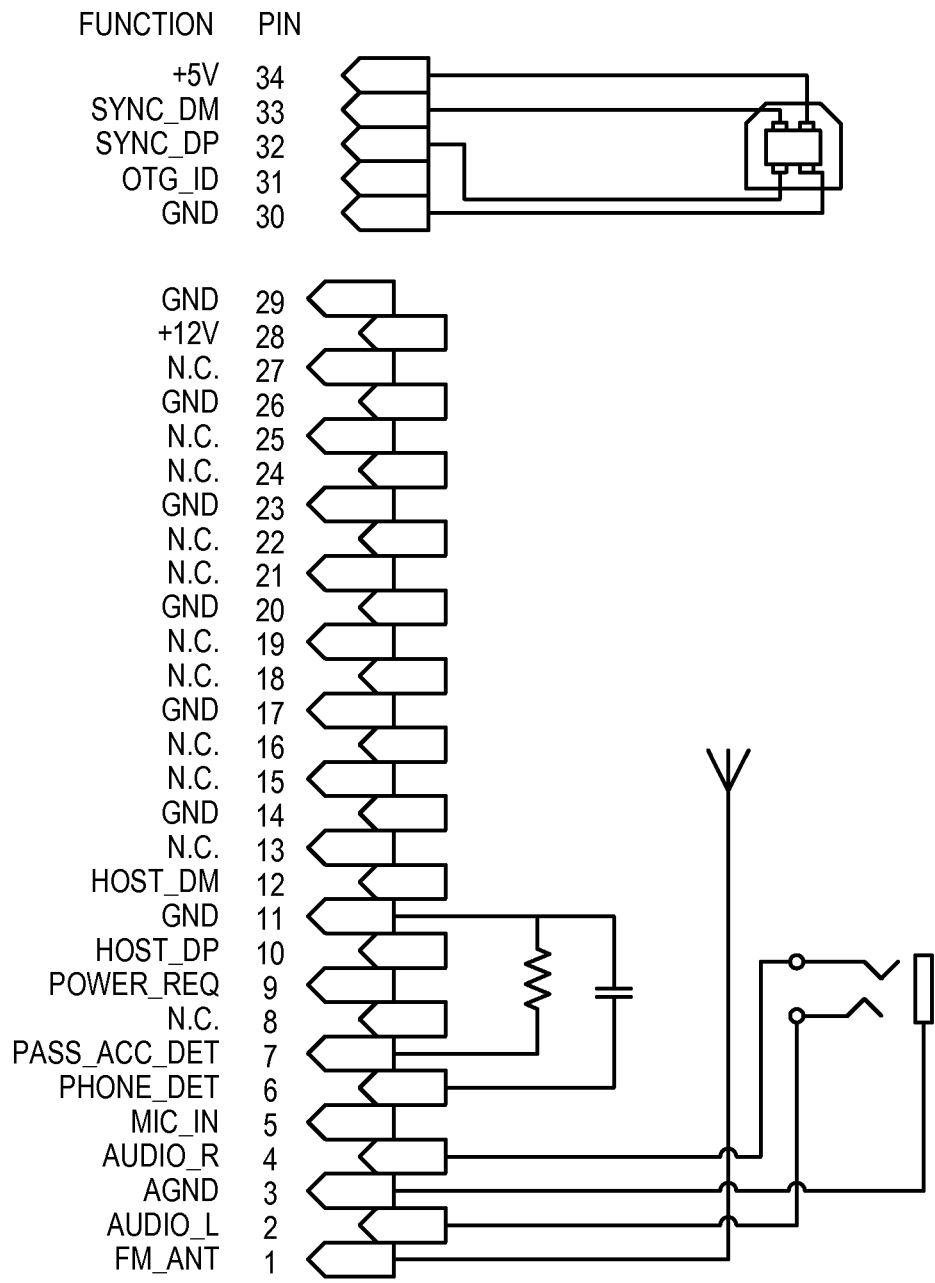
FIG. 12 is a schematic diagram of a passive dock accessory with audio output and synchronization and charge support connected to the exemplary host connector of FIG. 4.
Figure 13:
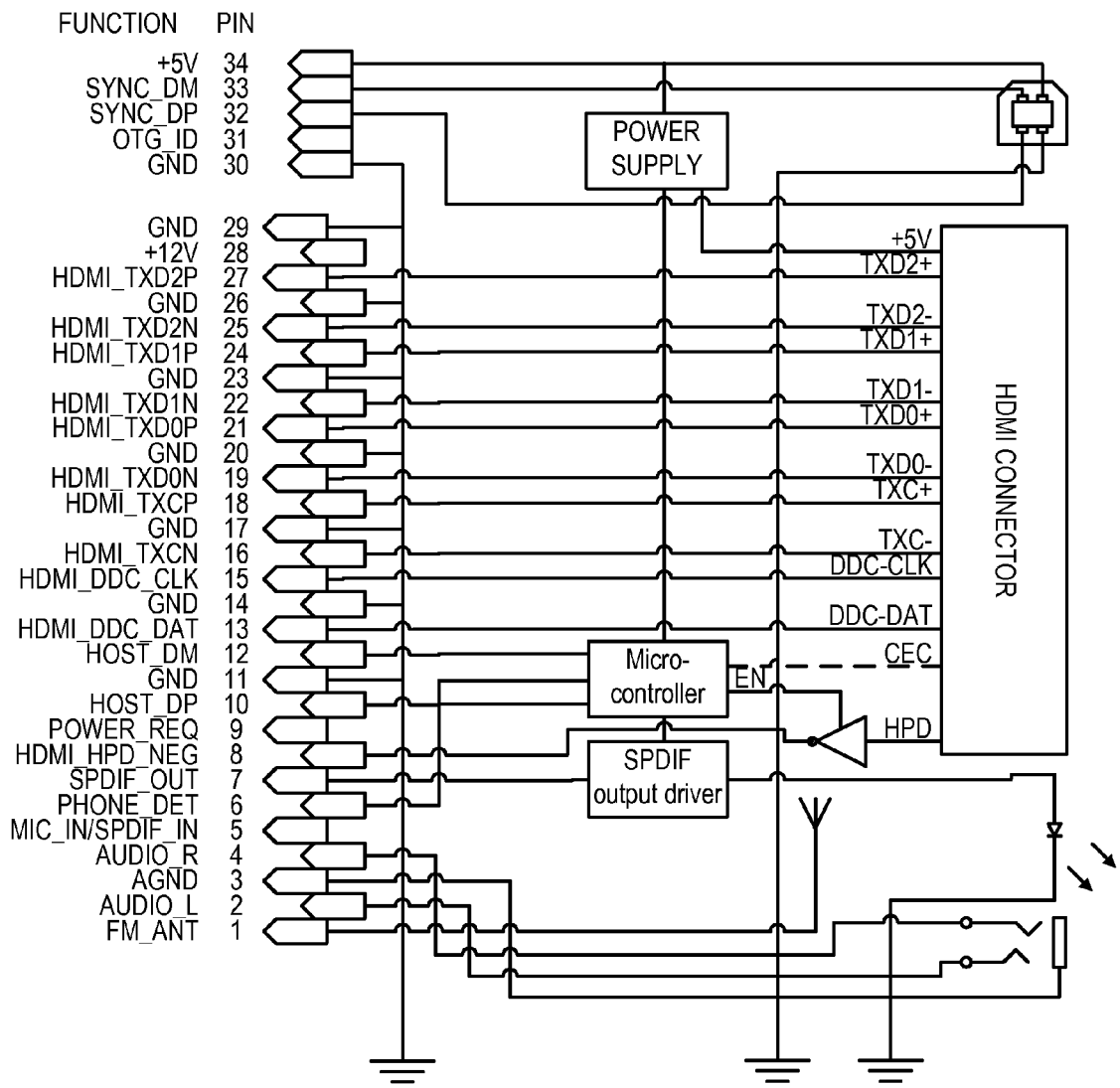
FIG. 13 is a schematic diagram of an active accessory device with HDMI and optical SPDIF output functions connected to the exemplary host connector of FIG. 4.
Figure 14:
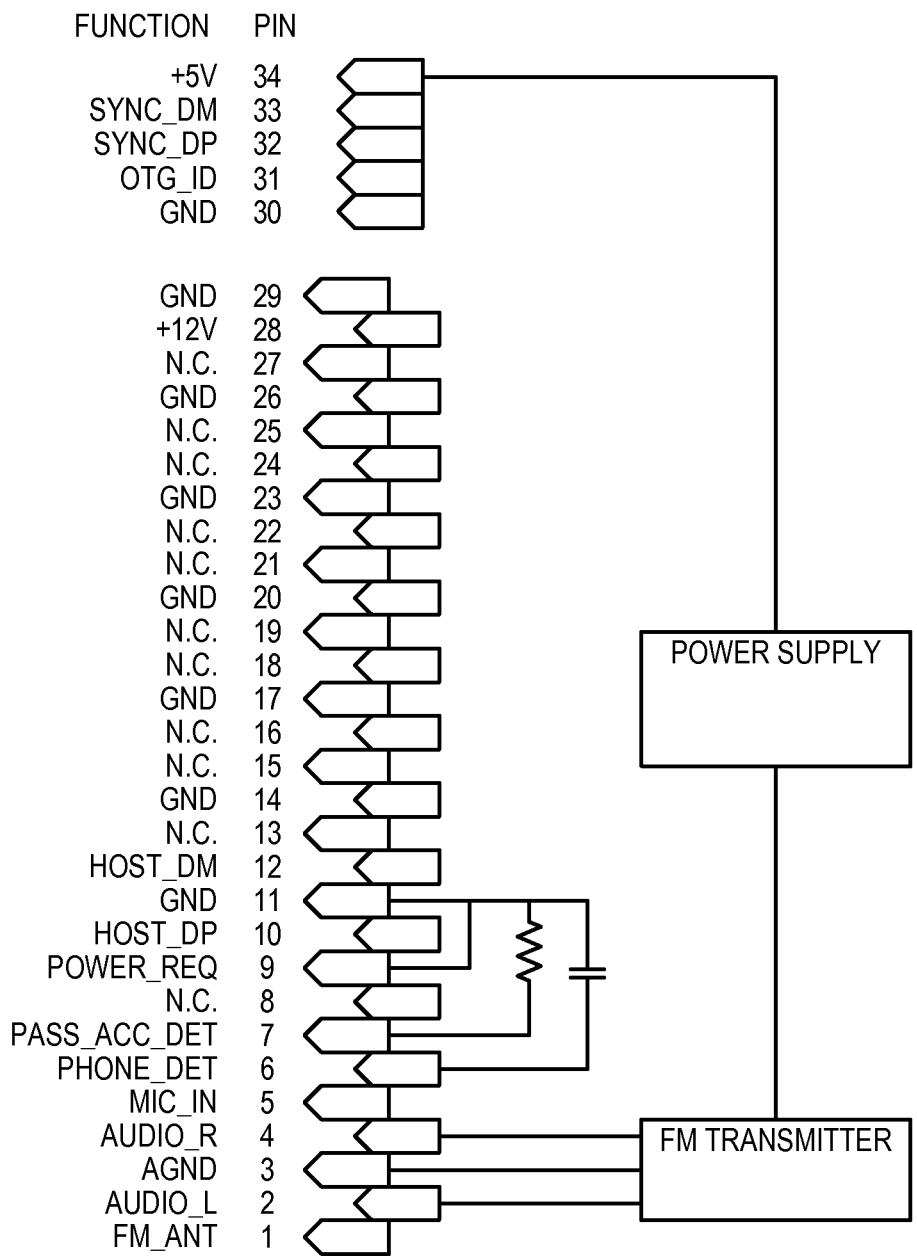
FIG. 14 is a schematic diagram of a phone powered FM transmitter accessory connected to the exemplary host connector of FIG. 4.

FIGS. 11-14 show schematic drawings of exemplary accessories connected to the 39-pin host connector of FIG. 4. FIG. 11 shows a simple stereo cable with a built-in FM antenna (pin 1) as an accessory. FIG. 12 shows a passive dock accessory device with stereo analog audio output (pins 2 and 4). The accessory in FIG. 12 can be synchronized with the host via the SYNC_DM and SYNC_DP pins and can be powered by the host via pin 34. FIG. 13 shows an active dock accessory with HDMI and optical SPDIF output capabilities. FIG. 14 shows an FM transmitter accessory powered by the host via pin 34.

In any of the embodiments described herein, the host and accessory devices can be components of a single, larger electronic device. For example, the host and accessory devices can be integrated circuits within an electronic device. Thus, in these embodiments, the described methods can be used to dynamically configure the pins of host and accessory connectors connected by a bus internal to the single, larger electronic device.

In some embodiments, the accessory device can take a more active role in determining which connection functions are enabled, in addition to sending a list of accessory device connector functions to the host device. For example, the accessory device can send accessory device information to the host device that includes information in addition to the functions supported by the accessory connector. The accessory device information can include information regarding the power consumption of the accessory device. Accessory device power consumption information can include the amount of power consumed by each function supported by the accessory connector or power consumption information of the accessory device as a whole. Current, anticipated and/or historic power consumption data can be supplied. The power consumption data can be in the form of average, peak, or root-mean-square power consumed.

The accessory device information can also include power configuration information such as whether the accessory device is running on battery power or is powered through an external connection. The power configuration information can include the type of external power connection, such as whether the accessory device is powered by an AC adapter or by a connection to a docking station or a personal computer through, for example, a USB connection. The power configuration information can include the maximum current that can be drawn by the accessory device through the external connection. In addition, the accessory device information can include the current charge level of the accessory device battery and the anticipated remaining operation time of the accessory device given current operating conditions. Further, the accessory device information can include a request by the accessory device to be powered by the host device.

The accessory device information can also include application information such as what applications the accessory device is currently executing, what applications are scheduled to be executed on the accessory device, and what applications are stored at or accessible to the accessory device for execution on the accessory device. The accessory device information can include various other types of information such as the clock speeds of the accessory device and the throughput capabilities of each supported accessory connection function. The host device can use any of this accessory device information in determining which connector functions to enable. For example, the host device can take into account accessory device power constraints due to the accessory device battery level, the applications currently running on the accessory device, or the maximum amount of power available to the accessory device depending on its power connection. Thus, an accessory device running one or more applications that consume greater amounts of power can limit which functions are to be enabled in a host-accessory connection. In some embodiments, the accessory device can implement policies to ensure that a host-accessory connection can be configured to support one or more selected accessory connections. For example, if the current operating conditions of the accessory leave too little accessory device to power one or more accessory connection functions, the accessory device can take actions to make the necessary power available. For example, the accessory device can reduce the operating frequency of one or more clocks of the accessory device or stop the execution of applications running on the accessory device. Accessory device information can also include processing information. For example, the accessory device information can include processing capacities or limitations of the accessory device.

In some embodiments, the accessory device can select a subset of the accessory device connector functions for sending to the host device, based on the accessory device information. For example, if the accessory device is running on battery power, the accessory device can select functions for sending to the host device that consume less power relative to other supported connection functions. In other embodiments, the accessory device can exclude connection functions that would exceed the accessory power budget, if enabled. In some embodiments, the accessory device can place conditions on the functions sent to host device. For example, if the power consumption of an accessory connector function fits within accessory device power constraints if the function is operated at or below a specific frequency, the accessory device can include this frequency in the accessory device information sent to the host device.

The accessory device can receive host device information from the host device as well. The accessory device can use the received host device information when selecting which accessory connection functions are to be sent to the host device. For example, the host device information can include a request by the host device to be powered by the accessory device through the host-accessory connection and can include the amount of power requested of the accessory device. The accessory device can either accept or deny the host device request for power, and, if accepted, can additionally select connection functions for sending to the host device, that, if enabled, do not exceed the accessory device power constraints if the accessory device provides power to the host device. In other embodiments, the host device information can include the amount of power that the host device can supply to the accessory device.

Thus, bus arbitration, the selection of which functions are to be supported by a host-accessory connection, can include the exchange of messages between the host and accessory devices. As described above, the host device can send a request to the accessory device for accessory device information. The host device can send host device information in addition to this request, such as a request for power from the accessory device. The accessory device information sent to the host device can include an indication of one or more functions that can be supported by the accessory device. All, or a subset of all of the functions supported by the accessory device can be included in this indication. The accessory device information can include additional accessory device information such as power consumption information, power configuration information, application information and the like. The accessory device can select which connection functions are to be sent to the host device based on the accessory device information and/or the received host device information. The host device can select one or more functions to be enabled at the host and accessory devices, or make other decisions, based on the received accessory device information. For example, if the host device has requested to be powered by the accessory device, and the accessory device information indicates that the accessory device is running off a battery that is near depletion, the host device can cancel its request. In some embodiments, the host device can base this selection on additional information about the host device similar to the accessory device information described above (e.g., host device power consumption information, power configuration information, host device application information, etc.). Accordingly, a host-accessory connection can be configured depending on the current operating conditions of the host and accessory devices. As discussed in greater detail below, the exchange of information between host and accessory devices can occur upon connection of an accessory device to a host device, at a later point in time such as prior to a new connection function being enabled, or at both times.

Figure 15:
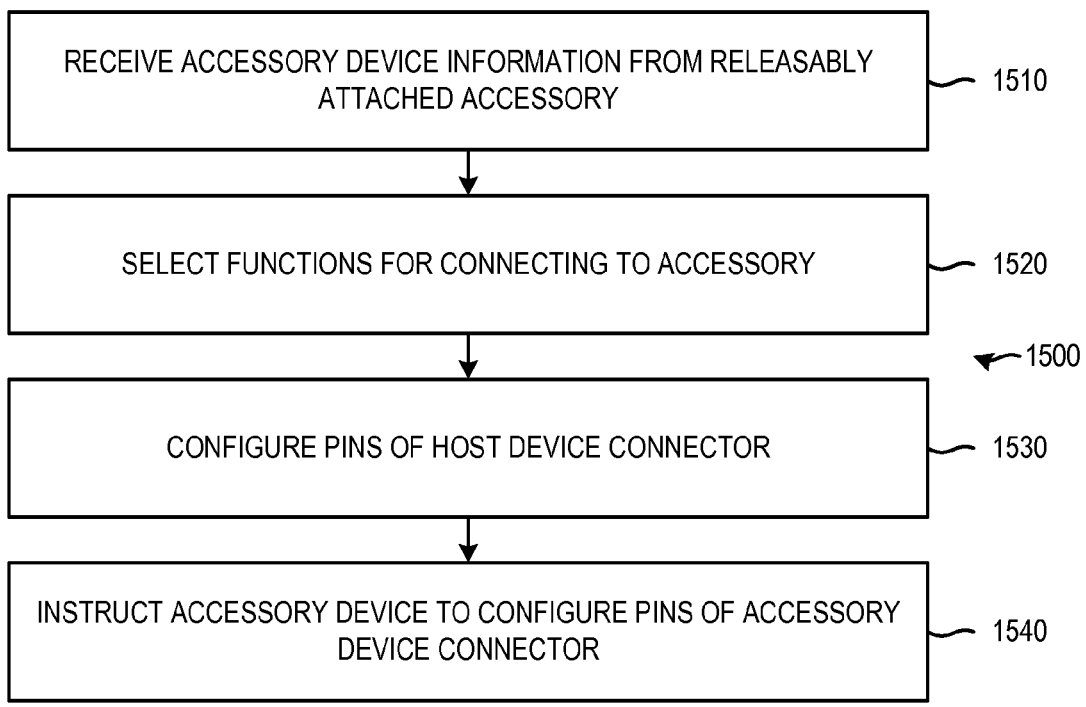
FIG. 15 is a flowchart of a second embodiment of an exemplary method of configuring a mobile host device connector for connecting an accessory device connector.

FIG. 15 is a flowchart of a second exemplary method of configuring a mobile host device connector for connecting to an accessory device connector. The method 1500 can be executed by, for example, a host mobile phone device connecting to an accessory media player. At 1510, accessory device information, such as that the media player supports HDMI and PCI-Express interfaces, can be received at the host device. The accessory device can be releasably attached to the host device. At 1520, the host device can select one or more functions to be enabled for connecting the host device to the accessory device. This selection can be based in part on the received accessory device information. For example, the mobile phone can select HDMI to be enabled at the host connector. At 1530, one or more pins of the mobile host device connector can be configured. The configuring can comprise enabling the one or more functions at the mobile host device connector. For example, the host mobile phone can enable HDMI at the mobile phone connector. In some embodiments, enabling one or more functions at the host device connector comprises, for respective of the pins to be configured, configuring the host device such that one of a plurality of host device pin controllers controls the respective pin. For example, if pin 13 of the host mobile phone is capable of being controlled by an HDMI DDC DAT pin controller or a PCIEX CLK+ pin controller, the mobile phone can be configured such that the HDMI DDC DAT pin controller controls pin 13. For example, the HDMI DDC DAT pin controller can be enabled and the PCIEX CLK+ pin controller can be disabled, or, if the pin controllers are connected to pin 13 by a switch, the switch can be configured to connect the HDMI DDC DAT controller to pin 13. At 1540, the accessory device can be instructed to configure one or more pins of the accessory device connector to support the one or more selected functions. In the example, the mobile host phone can instruct the accessory device to configure the accessory device connector to support HDMI.

Figure 16:
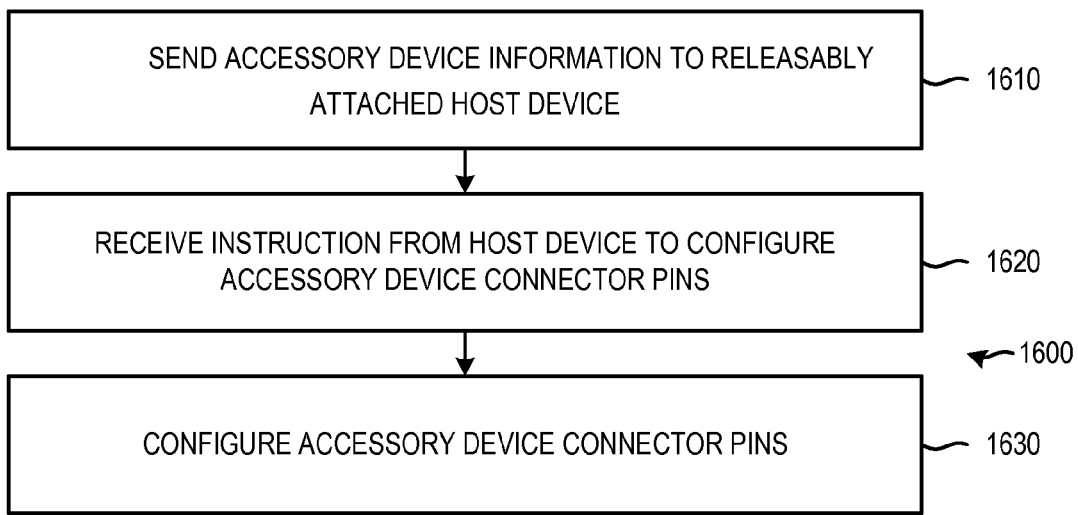
FIG. 16 is a flowchart of a second embodiment of an exemplary method of configuring an accessory connector connected to a host connector.

FIG. 16 is a flowchart of a second embodiment 1600 of exemplary method of configuring an accessory connector connected to a host connector. The method 1600 can be executed by, for example, an accessory laptop computer releasably connected to a host mobile phone device. At 1610, accessory device information, such as the personal computer supports HDMI, PCI-Express and SATA interfaces, can be sent to the host device. At 1620, an instruction from the host device to configure one or more pins of the accessory device connector to support one or more functions selected by the host device for connecting the accessory device to the host device can be received. For example, the laptop receives an instruction from the mobile phone to configure a connector to support PCI-Express and SATA interfaces. At 1630, one or more pins of the accessory device connector can be configured. The configuring can comprise enabling the one or more functions at the accessory device connector. For example, the laptop computer can enable the PCI-Express and SATA interfaces at the personal computer connector. In some embodiments, enabling the functions at the accessory device connector comprises, for respective of the pins to be configured, configuring the accessory device such that one of a plurality of accessory device pin controllers controls the respective pin. For example, if pin 13 of the accessory device is capable of being controlled by an HDMI DDC DAT pin controller or a PCIEX CLK+ pin controller, the accessory can be configured such that the HDMI DDC DAT pin controller controls pin 13. For example, the HDMI DDC DAT pin controller can be enabled and the PCIEX CLK+ pin controller can be disabled, or, if the pin controllers are connected to pin 13 by a switch, the switch can be configured to connect the HDMI DDC DAT controller to pin 13.

In any of the embodiments described herein, configuration of the host-accessory connection can be based on, and operation of the accessory device can conform to, various licensing policies. For example, an accessory device can require that a connected host device have the necessary license before allowing an accessory connector function to be enabled or an accessory device resource to be accessed. In one embodiment, a high-end printer accessory device can require a host device to have a license before allowing the host device to print documents to the printer. In any of the embodiments described herein, a pay-for-use licensing model can be employed in which a user of a host device purchases a license in order to gain access to the accessory device functions or resources using the host device. In some embodiments, a tiered licensing policy can be implemented in which the purchase of more expensive licenses provide greater access to accessory device resources. For example, a basic printer license can allow a host device to print a specified number of pages to an accessory device printer, an enhanced licensed can allow the host device to gain unlimited access to printer resources for a specified length period of time, and a premium license can grant permanent, unlimited access to the printer. The licensing schemes employed by the described host and accessory devices need not be based on pay-for-use models. Licensing approaches in which licenses can be obtained without payment can be employed as well.

In other embodiments, a license can provide a host device with access to media content stored at or accessible by an accessory device. Again, a tiered licensing approach can be used in which a host device can gain greater access to media content through purchase of a more expensive license. For example, a premium license can provide a host device user with unlimited access to media accessible to the accessory device.

If desired, an accessory can be bound to certain one or more hosts via a license. The license can be validated by the accessory. Such an arrangement can prevent use of a stolen accessory and discourage theft.

Numerous other licensing schemes and policies can be implemented for various types of host and accessory devices. Licenses can allow a host device to gain access to various types of accessory devices, such as media players, personal computers, workstations or medical equipment, to enable various functions of accessory devices such bus protocols having greater speed or throughout capabilities, playback or transfer of high definition video signals, Internet telephony, gaming, texting, video chat, GPS, a more secure host-accessory connection, etc., or ancillary services such as accessory device customer support.

A host device license can take various forms. For example, a user of a host device connected to an accessory can purchase or upgrade a license while the host device is connected to the accessory device. Alternatively, a host device license can be purchased through connection of the host device to an on-line service associated with an accessory device through a connection to a cloud, described below. The purchase of the license can result in the generation of a token for storage at the host device. The token can indicate the terms of a license such as which accessory device functions and/or resources the license provides access to or how much of an accessory resource the host device can consume (e.g., number of pages that can be printed, gigabytes of data that can be transferred, number of songs that can be downloaded). A host device license token allows a host device to gain access to accessory device resources and functions when the host device is connected to the accessory device. Host device licensing information, including token information, can be included as part of the host device information described earlier that is sent to the accessory device.

In other embodiments, an accessory device or resource accessible by the accessory device keeps track of host device licenses. For example, the accessory device can maintain a licensing database keyed by host device identifier. Upon connection of a host device to an accessory, the host device can send its host device identifier to the accessory device, and the accessory can determine whether the host device is licensed to use certain accessory device features or resources. Various other methods for keeping track of licenses that are known to persons of ordinary skill in the art can be used as well.

The accessory and/or host devices can determine or receive an indication when a license has expired or has been revoked. A license can expire because, for example, a specified number of pages have been printed, or a subscription period has ended. A license can be revoked because, for example, a cloned accessory or host device may no longer be considered a genuine or authentic device. If the license allowed enablement of a connector function, upon expiration of the license, the host device can reconfigure the host connector pins to disable the previously licensed function and instruct the accessory device to disable the same function at the accessory device connector. Alternatively, the accessory device can disable connector functions associated with an expired license without being instructed to do so by a host device.

The accessory and/or host devices can also determine or receive an indication when a new host device license is available, an expired license has been renewed or an existing license has been upgraded. For example, in response to an accessory device determining that an expired host device license has been renewed, the accessory device can send an indication to the host device that a connector function associated with the renewed license is available. The host device can enable this connector function at the host connector and instruct the accessory device to enable the same function at the accessory device connector. In some embodiments, the accessory device can enable accessory device connector functions associated with a renewed license without being instructed to do so by the host device.

In other embodiments, the host device can determine that a connection function has been licensed by detecting activity corresponding to the licensed function of the host-accessory connector. In response, the host device can configure the host connector to enable the licensed function. Thus, the host device can detect and configure a host connector to support a licensed function without having to receive an indication from the accessory device that the licensed connector function is available for use.

Figure 17:
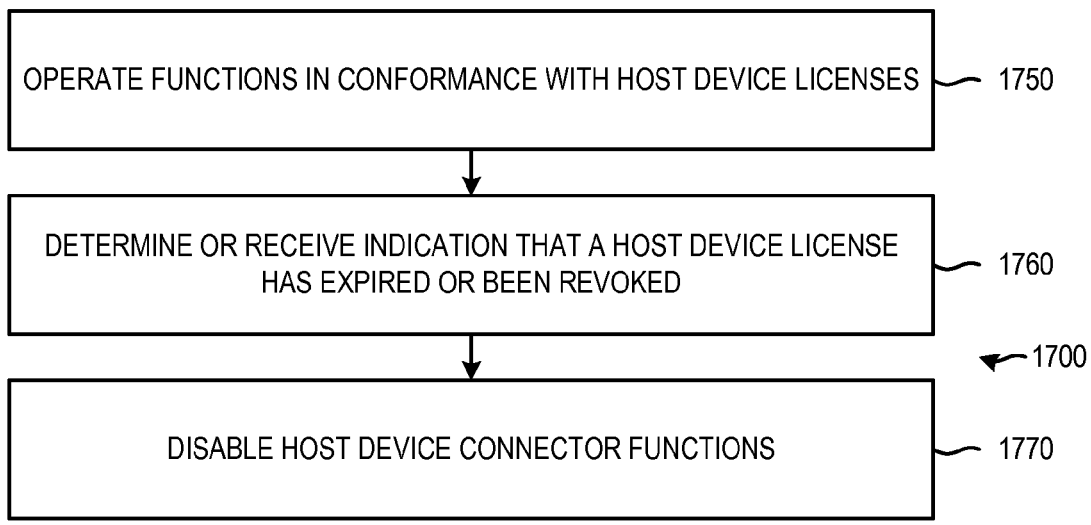
FIG. 17 is a flowchart of additional operations that can be performed as part of the flowchart shown in FIG. 15 for operating a connection in conformance with host device licenses and disabling connector functions in response to the expiration or revocation of a license.

FIG. 17 is a flowchart of additional operations 1700 that can be performed as part of the flowchart shown in FIG. 15 for operating a host-accessory connection in conformance with host device licenses and disabling connector functions in response to expiration of a license. Continuing with the example described above with respect to FIG. 15, the additional operations 1700 can be performed by a host mobile phone licensed to access media from an accessory media player. At 1750, the one or more functions enabled at the host-accessory connection can be operated in conformance with one or more host device licenses. For example, an HDMI bus can be operated to transfer data at a data rate no greater than that allowed by the host device license. At 1760, the expiration of at least one of the one or more host device licenses can be determined or an indication thereof can be received. For example, the host mobile phone can determine that the license has expired due to the expiration of the licensing period or an allowed number of gigabytes have been transferred. At 1770, at least one of the enabled one or more functions at the host device connector can be disabled in response to the determining or receiving an indication that at least one of the one or more host device licenses has expired. For example, the host device can disable the HDMI interface at the connector to the accessory media player connector in response to determining that the license allowing access to the media player has expired.

In addition to supporting licensing policies, host and accessory devices can support device authentication. When host-accessory device pair are connected, single authentication (the host device authenticates the accessory device or the accessory device authenticates the host device) or mutual authentication (the host and accessory devices authenticate each other) can be performed. Authentication can allow only genuine or approved accessory devices to be connected to or utilized by a host device. For example, a manufacturer of host and accessory devices can employ an authentication scheme such that accessory devices produced by the manufacturer can only connect to authenticated devices. Authenticated devices include other host or accessory devices produced by the manufacturer, a licensee of the manufacturer or any other organization that has obtained permission from the manufacturer to produce such devices. Such an authentication scheme can prevent the manufacturers' accessory devices from being used or accessed by devices made by manufacturers that have not obtained the permission to manufacture such devices (e.g., clones, knock-offs or copies). In one embodiment of an authentication scheme, an accessory speaker system can check whether a docked host mobile phone is an authenticated device before allowing songs stored on the mobile phone to be played on the speaker system.

In some embodiments, single or mutual authentication can be performed via TLS (transport layer security) handshake validation, as is known in the art. Transport layer security authentication can be unilateral or bilateral. In some embodiments, an accessory device can authenticate the host device based on host device information received by the accessory device. The host device information used for authentication can comprise, for example, a host device digital certificate, such as a signed certificate. The host device can authenticate the accessory device in a similar fashion. The host device can authenticate the accessory device based on accessory device information received from the accessory device. The host device can authenticate the accessory device based in part on an accessory device digital certificate included in the accessory device information. The host and accessory devices can each have access to a resource that can determine whether a received certificate is associated with an approved device. This resource can be a certificate database stored locally at the host or accessory device or accessible remotely via a network connection. The resource can be an algorithm that takes the received certificate as input and produces an indication of whether the certificate is associated with an approved or genuine device. Other authentication techniques can be used as well.

Figure 18:
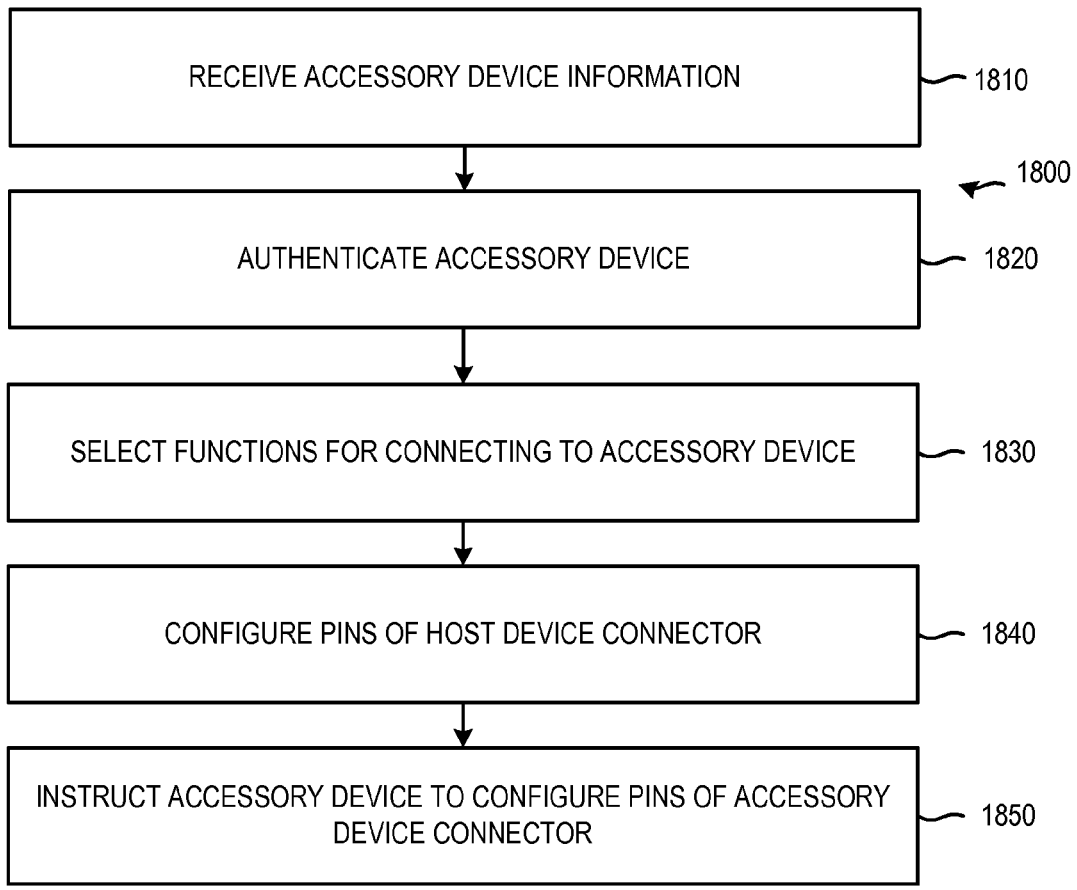
FIG. 18 is a flowchart of an exemplary method of configuring a mobile host device connector for connecting an accessory device connector including authenticating the accessory device.

FIG. 18 is a flowchart of an exemplary method of configuring a mobile host device connector for connecting an accessory device connector including authenticating the accessory device. The method 1800 can be executed by, for example, a host mobile phone device connecting to an accessory media player. At 1810, accessory device information, such as that the media player supports HDMI and PCI-Express interfaces, can be received at the host device. At 1820, the accessory device can be authenticated. At 1830, the host device can select one or more functions to be enabled for connecting the host device to the accessory device. This selection can be based in part on the received accessory device information and whether or not the accessory device has been authenticated. For example, the mobile phone can select HDMI to be enabled at the host connector, and only if the accessory device is an authenticated device. At 1840, one or more pins of the mobile host device connector can be configured. The configuring comprises enabling the one or more functions at the mobile host device connector. For example, the host mobile phone can enable HDMI at the mobile phone connector. At 1850, the accessory device can be instructed to configure one or more pins of the accessory device connector to support the one or more selected functions. In the example, the mobile host phone can instruct the accessory device to configure the accessory device connector to support HDMI.

In any of the embodiments described herein, the host-accessory connection can be encrypted to enable a secure connection. The host device can be a first security endpoint with a second security endpoint comprising an accessory device or a docking station (i.e., docking station 950 in FIG. 9) capable of connecting to one or more accessory devices. The encryption can be provided using transport layer security (TLS) or other cryptographic protocols known in the art. A host-accessory device or host-docking station pair can support the secure exchange of cryptographic keys for encryption and decryption of any of the buses enabled in a connection.

In any of the embodiments described herein, the pin controllers (i.e., controllers 412-419 and 421 in FIG. 4) that support various pin functions of host or accessory device connectors can be implemented in hardware (e.g., logic circuits as part of a larger integrated circuit), software (e.g., firmware) or a combination of the two. In embodiments where pin controller logic is implemented via firmware, the pin controller logic can be modified by upgrading the firmware of the host or accessory devices. Thus, the sets of host and accessory connector functions are extensible and can be upgraded to implement new bus protocols or connector functions, or to upgrade existing ones.

In any of the embodiments described herein, host and accessory devices can be configured to handle various scenarios. These scenarios include Insert Accessory, Remove Accessory, Reallocation of Device Resources and Power Management scenarios.

Insert Accessory Scenario

In the Insert Accessory scenario, a host device can initially be in a powered or idle state. An idle state reflects that the host device state machine with respect to an accessory device is in a default state. Upon insertion or connection of an accessory device to a host device, a control channel between the host and accessory devices can be the only active channel. This control channel can be a USB port (e.g., a mini- or micro-USB port) comprising a set of fixed-function pins (e.g., pins 422 in FIG. 4) or any other combination of host connector pins. The insertion of an accessory device can cause the host device to wake up. That is, the host device can transition from a low-power state such as a sleep or hibernation state, to a powered state. One technique for implementing such a wake-up scenario is to monitor certain pins for voltage level transitions and upon such a detection, automatically transition the host to an active state.

After insertion, the host device can authenticate the accessory device, for example, by performing a TLS handshake (i.e., by the host device sending a challenge to the accessory device and receiving a proper response). If the accessory device cannot be authenticated, the host device can execute the Accessory Removal scenario described in greater detail below. Alternatively, the host device can allow limited interaction with an unauthenticated accessory device. For example, the host device can query the accessory to see if the accessory device supports specific functions that the host device can allow to be enabled, even if the accessory device fails authentication. If the accessory device informs the host that any such functions are supported by the accessory, the host device can enable these functions at the host device connector and instruct the accessory device to enable these functions at the accessory device connector as well. In other embodiments of the Insert Accessory scenario, the host device can elect to not trust the unauthenticated accessory. That is, the host device can ignore any activity on the host-accessory connection initiated by the unauthenticated accessory device.

After the accessory device has been authenticated, the host device can send an EnumerateFeature request to the accessory device. This request can contain the version of the host device software protocol embodying one or more of the methods described herein and can include both the major and minor versions of the protocol. If the accessory device does not support the version of the software protocol indicated in the EnumerateFeature request, the accessory can return an error to the host device. If the host software protocol version is supported, the accessory supplies accessory device information to the host device. As described above, accessory device information can comprise accessory power consumption information, power configuration information, application information, processing capacity information, accessory device connector functions, and the like. The accessory device information can indicate which functions are supported by the accessory connector (e.g., USB 2.0, USB 3.0, PCI-Express, HDMI), which accessory connector pins support each function and which functions can be operated concurrently. The accessory device information can also include the accessory device software protocol version, including both major and minor versions. The minor version can be used to identify accessory devices and functions that are backwards compatible with the host device if entire host and accessory device protocol versions are not identical. The accessory device information can further include the authentication version, an accessory device unique identifier (e.g., the accessory device globally unique identifier), and accessory device class and sub-class.

In some embodiments of the Insert Accessory scenario, the accessory device can provide some accessory device information in response to the "enumerate features" request, with additional accessory device information supplied at a later time. For example, the accessory device can send information about a supported function to the host just prior to the function being enabled by the accessory device.

After receiving the accessory device's response to the EnumerateFeature request, the host device can determine which connector functions to enable and which pins are to be associated with those functions. The host device can send an instruction to the accessory which connector functions to enable and which functions should be enabled by which pins. In response, the accessory device can enable the pin and function combination as instructed by the host device. The accessory device can also configure any related hardware or software needed to enable traffic across the host-accessory connector. The accessory device can then send an acknowledgment to the host device that the requested functions have been enabled at the requested pins, and that the accessory device is ready to receive communication at the enabled pins. The host device can then enable the selected functions at the selected pins of the host device connector and load the appropriate software drivers for the specified functions. Applications and other resources executing on the host and accessory devices can then be notified that the enabled connector functions are available for use.

Remove Accessory Scenario

In a Remove Accessory scenario, an accessory device can be removed from a host device. A Remove Accessory scenario can be initiated by software, hardware or by surprise. In a software initiated removal, the host device operating system, or other software executing on the host device, can initiate the removal process. The host device operating system can decide to initiate the removal process on its own or in response to input received from a user of the host device. In a hardware initiated removal, the accessory can have a button or other input, that, when pressed, generates a removal request that can be sent to the host device. In a removal initiated by surprise, the physical connection between host and accessory devices can be broken without notice to the host device. For example, a user can simply remove a host device from a docking station or disconnect cable connecting the host device to an accessory.

After initiation of the removal process, the Remove Accessory scenario can perform the following. The host device can issue appropriate notifications to host device applications communicating with the accessory device. Once these host device applications have completed executing, the host can stop the software device drivers and corresponding bus protocol stacks. If the removal was initiated by surprise, the Remove Accessory scenario can be completed at this point.

If the removal is software or hardware initiated, the host device informs the accessory device that the host accessory device can be removed. The accessory device can then perform the necessary hardware and software actions to stop the software protocol stacks and hardware buses corresponding to the enabled accessory connector functions. The accessory can then inform the host device that the accessory has powered down the respective buses and that the host device can notify a user of the host device that it is safe to disconnect the host device from the accessory device. In response, the host device can send a PowerOff instruction to the accessory device and notify the user that it is safe to disconnect the host device from the accessory.

Resource Reallocation Scenario

In a Resource Reallocation scenario, host and accessory connectors can be reconfigured to enable different connector functions or to map enabled functions to different pins. Resource reallocation can be performed several different ways. If a full Remove Accessory or Insert Accessory scenario is initiated, the host device can choose a different pin mapping or set of connector functions to be enabled at the host connector. In a partial remove sequence, the host device can stop the specified connector functions and no connector reconfiguration is performed. In this situation, the host device issues the appropriate software notifications to host device applications communicating with the accessory device. Once these host device applications have completed executing, the host can stop the software device drivers and corresponding bus protocol stacks. The host operating system can then inform the accessory device indicating which connector functions and/or pins are to be disabled. The accessory device can then perform the necessary hardware and software actions to stop the software protocol stacks and hardware buses on the appropriate pins, and can send a return message to the host device indicating that the indicated connection functions and pins have been powered down.

Once the indicated connector functions have been disabled at the host and accessory, a different set of connector functions can be enabled. The host device can inform the accessory device which accessory connection functions to enable, and which accessory pins are to enable these functions. The accessory device can then enable the specified pin/connector function combinations and configure any related hardware or software needed to enable signal traffic across the enabled pins. The accessory device can communicate to the host that the specified connector functions and pins are enabled and that the accessory device is ready to receive appropriate signaling over the enabled buses and pins. The host device can then enable the same connector functions at corresponding pins on the host device connector, and load the appropriate software drivers. The host device can then begin communication on the enabled pins using the enabled connector functions. Host device application can then be notified that the enabled connector functions are available for use.

Power Management Scenario

The Power Management Scenario applies to the control channel of the host-accessory connection. Connector functions (e.g., USB, PCI-Express) operating on other channels can use the power management conventions as described in their respective specifications. Power Management scenarios can be hardware or software initiated.

In a hardware initiated Power Management scenario, the accessory device can have a button or other inputs that, when pressed or activated, generate a PowerActive, PowerSuspend or PowerOff request to the host device over the control channel. A PowerActive request wakes the host device if the host is not already in an active state. Upon receiving a PowerActive request, the host device resumes normal activities if the host was previously in an inactive state such as a sleep, hibernation, standby or off state. A PowerSuspend request places the host device in a suspended power state, such as sleep, hibernation or standby. A PowerOff request causes the host device to power off.

In a software initiated Power Management scenario, the host device operating system or other software initiates the power state transition. The host device software can decide to transition to another power state on its own, or based on user input. The host device can determine that there has been no activity on the host-accessory connection for a pre-determined or user-specified period, and decide to place the host device is a suspended state (sleep, hibernation, standby) or to power off the host device. The host device can send a PowerActive, PowerSuspend or PowerOff instruction to the accessory device.

A PowerActive request can cause the accessory device to transition from a suspended (standby, sleep or hibernation state) state or off state to an active power state. The previous configuration of the host-accessory connector can be re-enabled or restored. In some embodiments, the host device can re-authenticate and/or re-enumerate the accessory device, as the host device may no longer be connected to the same accessory device as it was prior to entering the suspended or off state, or the host device may no longer be connected to any accessory device at all. If the accessory lost power while in the suspended or off state, it can return a fail message to the host device in response to the PowerActive request. In response to receiving a PowerSuspend request, the accessory device can power down, and ensure that the present connector configuration (e.g., enabled accessory connector functions, which pins are mapped to the enabled connector functions) is not lost. This configuration can be stored at the accessory device or at a resource accessible to the accessory device. The accessory device can power down to a low-power state, but continue operation at a power level sufficient to enable a quick resumption of full operation. A PowerOff request can cause the accessory device to cut off power to the accessory.

Generally, the scenarios described above use the control channel of the host-accessory connection, although other channels or connector functions can be used to execute the above scenarios. In such a case, the above scenarios, including additional scenarios such as device enumeration, start device and stop device scenarios can be handled by the specific mechanisms available to each controller function. For example, in an embodiment where a host-accessory pair are communicating over a USB channel other than the control channel, that USB channel can handle the enumerate device and other scenarios.

The dynamically configurable host and accessory connectors described herein provide a low pin count connector able to support a wide variety of communication interfaces at the system level. For a given set of connector capabilities, the pin count of a host connector comprising multi-function pins can likely be less than that of a connector comprised entirely of dedicated, fixed-function pins. The connectors as described herein can accommodate the evolving communication capabilities of host and accessory devices. For example, a host connector can be reconfigured as new accessories implement the various interfaces supported by the connector. In addition, the host connector can be integrated into host and accessory devices capable of supporting new functions added to existing protocols or entirely new protocols. Although new controller designs can be needed to support these new functions, the physical design of the connector can remain the same, as long as there are a sufficient number of pins to support the new and updated interfaces. Thus, the connector as described herein is flexible and expandable, is forward and backward compatible to allow older devices to communicate with newer ones, and is less likely to require physical modification as communication interfaces continue to evolve.

Figure 19:
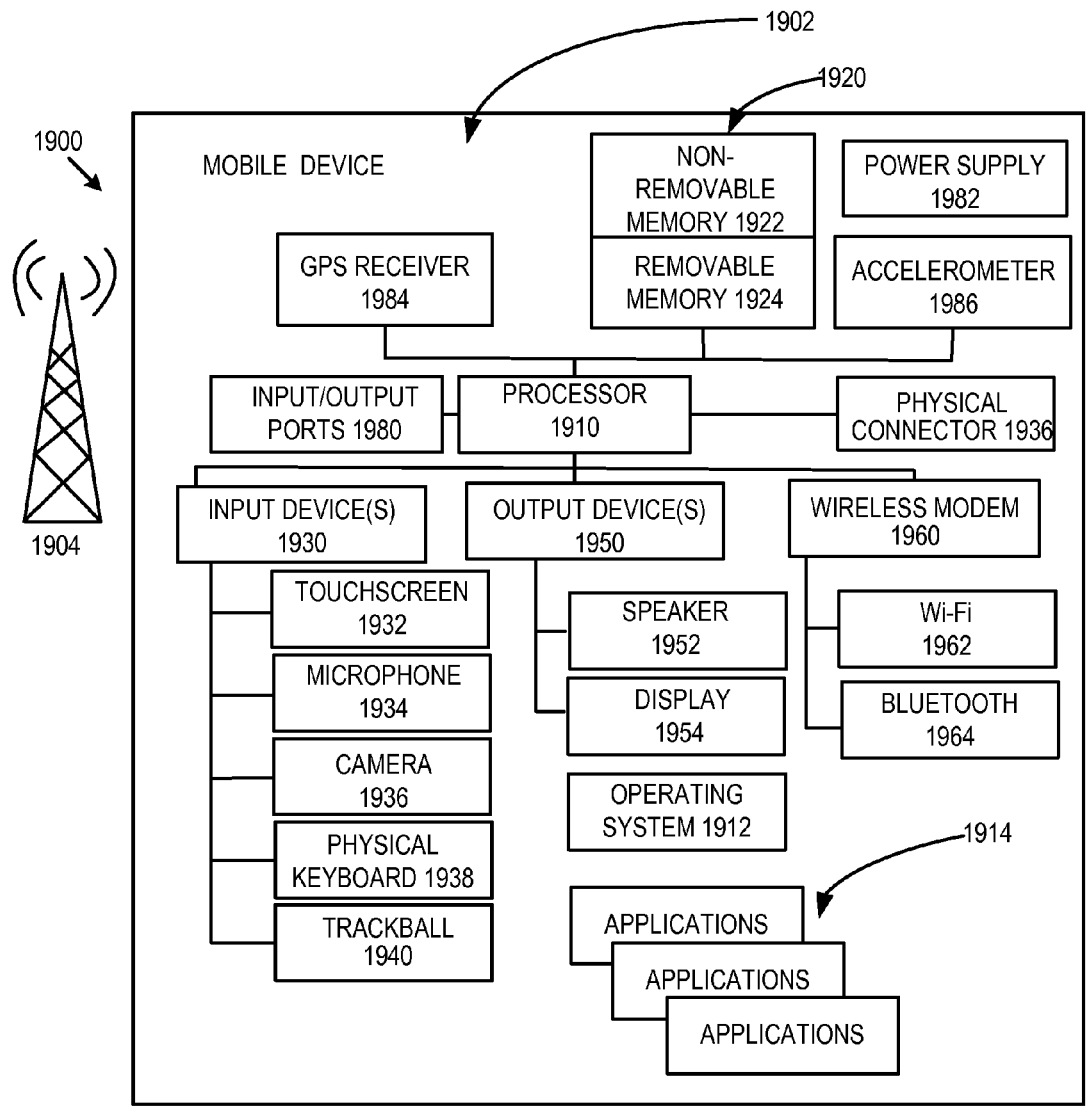
FIG. 19 is a block diagram of an exemplary mobile device.

FIG. 19 is a system diagram depicting an exemplary mobile device 1900 including a variety of optional hardware and software components, shown generally at 1902. Any components 1902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 1904, such as a cellular or satellite network.

The illustrated mobile device 1900 can include a controller or processor 1910 (e.g., signal processor, microprocessor, ASIC, or other control and processing logic circuitry) for performing such tasks as signal coding, data processing, input/output processing, power control, and/or other functions. An operating system 1912 can control the allocation and usage of the components 1902 and support for one or more application programs 1914. The application programs can include common mobile computing applications (e.g., email applications, calendars, contact managers, web browsers, messaging applications), or any other computing application.

The illustrated mobile device 1900 can include memory 1920. Memory 1920 can include non-removable memory 1922 and/or removable memory 1924. The non-removable memory 1922 can include RAM, ROM, flash memory, a hard disk, or other well-known memory storage technologies. The removable memory 1924 can include flash memory or a Subscriber Identity Module (SIM) card, which is well known in GSM communication systems, or other well-known memory storage technologies, such as "smart cards." The memory 1920 can be used for storing data and/or code for running the operating system 1912 and the applications 1914. Example data can include web pages, text, images, sound files, video data or other data sets to be sent to and/or received from one or more network servers or other devices via one or more wired or wireless networks. The memory 1920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1900 can support one or more input devices 1930, such as a touch screen 1932, microphone 1934, camera 1936, physical keyboard 1938 and/or trackball 1940 and one or more output devices 1950, such as a speaker 1952 and a display 1954. Other possible output devices (not shown) can include piezoelectric or other haptic output devices. Some devices can serve more than one input/output function. For example, touchscreen 1932 and display 1954 can be combined in a single input/output device.

A wireless modem 1960 can be coupled to an antenna (not shown) and can support two-way communications between the processor 1910 and external devices, as is well understood in the art. The modem 1960 is shown generically and can include a cellular modem for communicating with the mobile communication network 1904 and/or other radio-based modems (e.g., Bluetooth or Wi-Fi). The wireless modem 1960 is typically configured for communication with one or more cellular networks, such as a GSM network for data and voice communications within a single cellular network, between cellular networks, or between the mobile device and a public switched telephone network (PSTN).

The mobile device can further include at least one input/output port 1980, a power supply 1982, a satellite navigation system receiver 1984, such as a Global Positioning System (GPS) receiver, an accelerometer 1986, and/or a physical connector 1936, which can be the connector described herein. The illustrated components 1902 are not required or all-inclusive, as any components can deleted and other components can be added.

Figure 20:
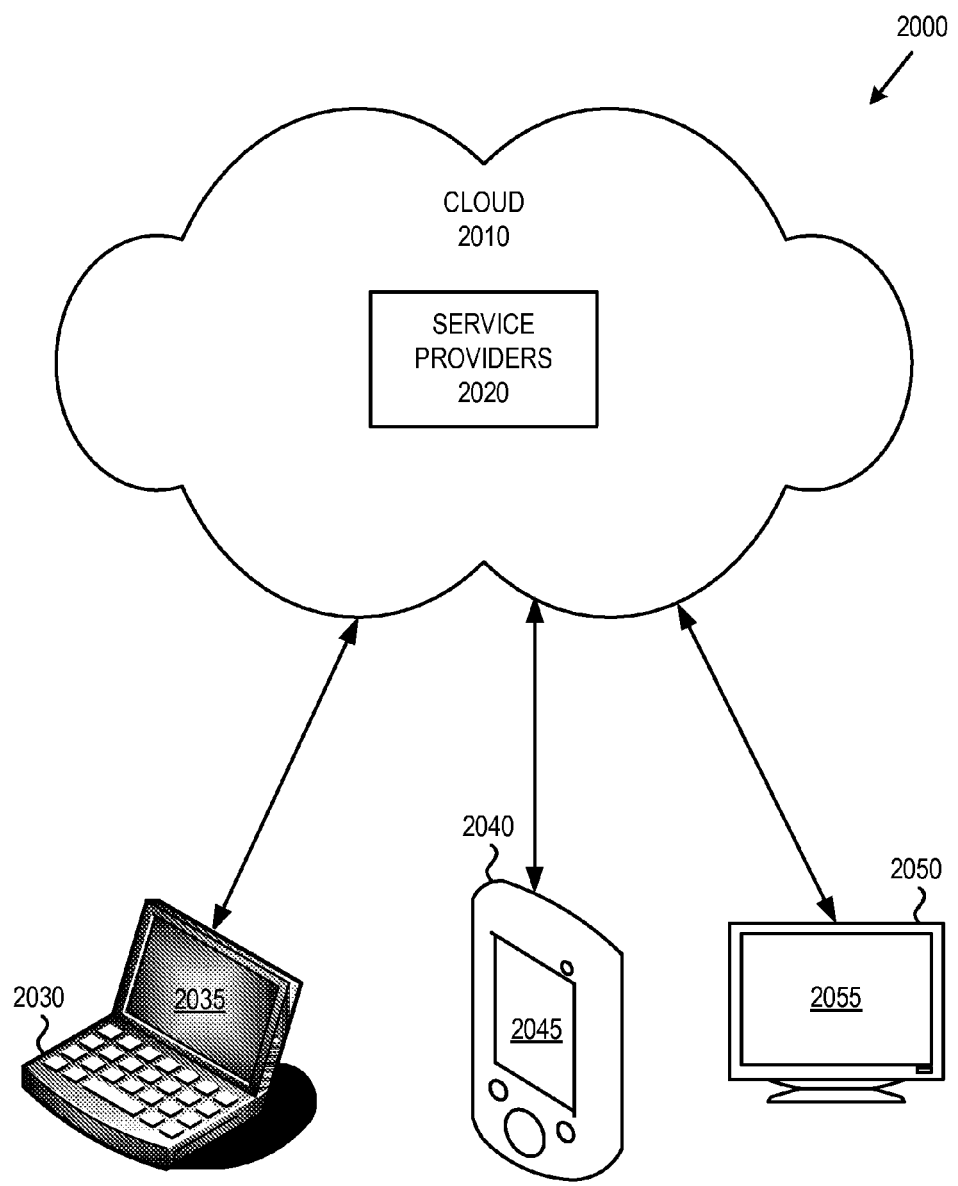
FIG. 20 is a block diagram of a cloud computing environment in which host and accessory devices can operate.

FIG. 20 illustrates a generalized example of a suitable implementation environment 2000 in which described embodiments, techniques, and technologies may be implemented.

In example environment 2000, various types of services (e.g., computing services) can be provided by a cloud 2010. For example, the cloud 2010 can comprise a collection of computing devices, which may be located centrally, or distributed, that provide cloud-based services to various types of users and devices connected via a network such as the Internet. The implementation environment 2000 can be used in different ways to accomplish computing tasks. For example, some tasks (e.g., processing user input and presenting a user interface) can be performed on local computing devices (e.g., connected devices 2030, 2040, 2050) while other tasks (e.g., storage of data to be used in subsequent processing) can be performed in the cloud 2010.

In example environment 2000, the cloud 2010 provides services for connected devices 2030, 2040, 2050 with a variety of screen capabilities. Connected device 2030 represents a device with a computer screen 2035 (e.g., a mid-size screen). For example, connected device 2030 could be a personal computer such as desktop computer, laptop, notebook, netbook or the like. Connected device 2040 represents a device with a mobile device screen 2045 (e.g., a small size screen). For example, connected device 2040 could be a mobile phone, smart phone, personal digital assistant, tablet computer and the like. Connected device 2050 represents a device with a large screen 2055. For example, connected device 2050 could be a television screen (e.g., a smart television) or another device connected to a television (e.g., a set-top box or gaming console) or the like. One or more of the connected devices 2030, 2040, 2050 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 2000. For example, the cloud 2010 can provide services for one or more computers (e.g., server computers) without displays.

Services can be provided by the cloud 2010 through service providers 2020, or through other providers of online services (not depicted). For example, cloud services can be customized to the screen size, display capability, and/or touch screen capability of a particular connected device (e.g., connected devices 2030, 2040, 2050).

In example environment 2000, the cloud 2010 provides the technologies and solutions described herein to the various connected devices 2030, 2040, 2050 using, at least in part, the service providers 2020. For example, the service providers 2020 can provide a centralized solution for various cloud-based services. The service providers 2020 can manage service subscriptions for users and/or devices (e.g., for the connected devices 2030, 2040, 2050 and/or their respective users).

Accessory devices and host devices as described herein allow various mobile computing operations to be performed. For example, an accessory device such as a car audio head unit could access an online marketplace or other Internet-based services by using the wireless modem capabilities of a connected host device. In another example, an accessory device could access the Internet through the host device to check for the availability of firmware or software upgrades.

In yet another example, the connection of an accessory to a host could invoke an accessory-specific user interface or user experience on the host or accessory device. For example, connection of an accessory device to a host device could invoke a user interface on the host device that allows the host device user to browse and purchase applications that are applicable or specific to the connected accessory. These applications could run on the host device and/or accessory device. In one example, upon connection of a host mobile phone to an accessory car dock, the mobile phone can access a marketplace offering applications specific to the functions or functionality available through the car dock, such as car diagnostic applications or upgrades for applications already installed on the mobile phone or car dock. The offered applications or services could be related to the specific car type (make, model and year), or to the class of car (cars of a specific make). In another example, connection of a mobile phone to a car dock can invoke a host device user interface indicating nearby dealers or mechanics capable of serving the specific car make and model if car diagnostic applications executing on the accessory device communicate to the host device that the car is in need of service.

In other examples, accessory-specific user experiences can be invoked by the connection of a host device mobile phone to a personal or laptop computer, television, media player or other accessory device. For example, in response to connecting a mobile phone to a personal computer, a pop-up window can appear on the mobile phone screen asking the mobile phone user if they are interested in browsing for applications or devices related to the attached computer. Accessory-specific offers, notices or other related communications can be related to the host device user in various ways, such as the user receiving a text or an email regarding the accessory, an accessory-specific application being executed on the host device, or a web browser opening a webpage related to the connected accessory.

In addition to enabling accessory-specific purchases, the user experience initiated upon connection of a host device to an accessory can provide the host device user with various types of accessory-specific notices. In the automotive example, the user can be notified that the car is due for scheduled maintenance. In the personal computer example, the user can be notified that firmware or software upgrades are available for download over the network. Additional notices that can be communicated to the host device user include, for example, special offers made by the manufacturer of a connected device.

Invocation of accessory-specific user experiences can be made upon connection of a host device to an accessory, or at a later time. For example, if the host device is unable to wirelessly connect to a network upon connection of the host device to the accessory, the host device can store information relating to the connection (e.g., time of connection, accessory identifying information) and invoke the accessory-specific user experience at a later time. For example, the user experience can be invoked when the host device determines the availability of network connectivity or at another time in accordance with user preferences.

In one example of enabling accessory-specific user experiences, the accessory device can store accessory-specific metadata. For example, an accessory device can store information indicating the accessory category, type, class, sub-class or the like. The metadata can also include information related to capabilities of the accessory.

Accessory metadata can be shared with a host device upon connection of the accessory to the host, or it can be provided upon request of the host device. The host device can pass accessory metadata to the cloud for use by various cloud services. For example, communication of attribute accessories to an on-line marketplace can allow the marketplace to tailor its offerings to products and services related to the attached accessory to the user of the host device.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Additional embodiments and aspects of the technologies described herein are described in the following numbered embodiments.

Embodiment 1

A method of configuring a connector (220, 420) of a host device (200, 400) for connecting to a accessory device (250, 1050) connector (270, 1070) of an accessory device (250, 1050), comprising: at the host device (200, 400), receiving accessory device information from the accessory device (250, 1050), wherein the accessory device (250, 1050) is releasably attached to the host device (200, 400); selecting, based in part on the received accessory device information, one or more functions to be enabled for connecting the host device (200, 400) to the accessory device (250, 1050); configuring host device connector (220, 420) one or more pins (228, 426) of the host device connector (220, 420), the configuring comprising enabling the one or more selected functions at the host device connector (220, 420); and instructing the accessory device (250, 1050) to configure one or more pins (278, 1078) of the accessory device connector (270, 1070) to support the one or more selected functions.

Embodiment 2

The method of any of the previous numbered embodiments, wherein the enabling the one or more functions at the host device connector (220, 420) comprises, for respective of the one or more pins (228, 426) to be configured, configuring the host device (200, 400) such that one of a plurality of host device pin controllers (412-419, 421) controls the respective one or more pins (228).

Embodiment 3

The method of any of the previous numbered embodiments, wherein the received accessory device information comprises an indication of one or more functions supported by the accessory device connector (270, 1070).

Embodiment 4

The method of any of the previous numbered embodiments, wherein the received accessory device information comprises accessory device power configuration, power consumption and/or application information.

Embodiment 5

The method of any of the previous numbered embodiments further comprising authenticating the accessory device (250, 1050), wherein the selecting one or more functions is further based in part on whether the accessory device (250, 1050) is authenticated.

Embodiment 6

The method of any of the previous numbered embodiments, wherein the selecting one or more functions is further based in part on one or more host device licenses.

Embodiment 7

A method of configuring a accessory device (250, 1050) connector (270, 1070) of an accessory device (250, 1050) for connecting to a connector (220, 420) of a host device (200, 400), comprising: sending accessory device information to the host device (200, 400), the accessory device (250, 1050) releasably attached to the host device (200, 400); receiving an instruction from the host device (200, 400) to configure one or more pins (278, 1078) of the accessory device connector (270, 1070) to support one or more functions selected by the host device for connecting the accessory device (250, 1050) to the host device (200, 400); and configuring the one or more pins (278, 1078) of the accessory device connector (270, 1070), the configuring comprising enabling the one or more functions selected by the host device at the accessory device connector (270, 1070).

Embodiment 8

The method of any of the previous numbered embodiments, wherein the accessory device information comprises accessory device power configuration, power consumption and/or application information.

Embodiment 9

The method of any of the previous numbered embodiments, wherein the accessory device information comprises an indication of one or more functions supported by the accessory device connector (270, 1070).

Embodiment 10

The method of any of the previous numbered embodiments, wherein the indicated one or more functions excludes at least one function supported by the accessory device connector (270, 1070), the method further comprising determining the excluded at least one function based in part on accessory device power consumption, power configuration and/or application information.

Embodiment 11

The method of any of the previous numbered embodiments, further comprising: receiving host device information comprising host device licensing information; and selecting the one or more functions indicated in the accessory device information based in part on the host device licensing information.

Embodiment 12

The method of any of the previous numbered embodiments, further comprising: determining or receiving an indication that at least one host device licenses has expired or been revoked; and disabling at least one of the one or more selected functions enabled at the accessory device connector (270, 1070) in response to the determining or receiving an indication that at least one host device licenses has expired or been revoked.

Embodiment 13

The method of any of the previous numbered embodiments, further comprising: receiving host device information; authenticating the host device (200, 400); and selecting one or more functions supported by the accessory device connector (270, 1070), wherein the accessory device information sent to the host device (200, 400) comprises the indication of the selected one or more functions.

Embodiment 14

A host device programmed to carry out a method, the method comprising: using the host device: (200, 400), receiving accessory device information from an accessory device (250, 1050) releasably attached to the host device; selecting, based in part on the accessory device information, one or more functions to be enabled for connecting the host device (200, 400) to the accessory device (250, 1050); configuring one or more pins (228, 426) of a connector of the host device (200, 400), the configuring comprising enabling the selected one or more functions at the connector of the host device (200, 400); and instructing the accessory device (250, 1050) to configure one or more pins (278, 1078) of a connector of the accessory device (250, 1050) to support the selected one or more functions.

Embodiment 15

The host device of any of the previous numbered embodiments, wherein the selecting one or more functions is further based in part on one or more host device licenses, the method further comprising operating the at least one host device and the accessory device in conformance with the one or more host device licenses.

The disclosed methods, apparatuses and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

We claim:
1. A method of configuring a connector of a host device for connecting to a connector of an accessory device, comprising:
at the host device, receiving accessory device information from the accessory device, wherein the accessory device is releasably attached to the host device;
selecting, based in part on the received accessory device information, one or more functions to be enabled for connecting the host device to the accessory device, wherein the selecting one or more functions is further based in part on one or more host device licenses;
configuring one or more pins of the host device connector, the configuring comprising enabling the one or more selected functions at the host device connector;

instructing the accessory device to configure one or more pins of the accessory device connector to support the one or more selected functions;

determining or receiving an indication that a host device license, of the one or more host device licenses, has been renewed or upgraded or that a new host device license is available;

selecting one or more second functions to be enabled for connecting the host device to the accessory device based in part on the renewed, upgraded or new host device license;

configuring one or more pins of the host device connector, the configuring comprising enabling the one or more second selected functions at the host device connector; and instructing the accessory device to configure one or more pins of the accessory device connector to support the one or more second selected functions.

2. The method of claim 1, wherein the enabling the one or more selected functions at the host device connector comprises, for respective of the one or more pins to be configured, configuring the host device such that one of a plurality of host device pin controllers controls the respective one or more pins.

3. The method of claim 1, wherein the received accessory device information comprises an indication of one or more functions supported by the accessory device connector.

4. The method of claim 1, wherein the received accessory device information comprises accessory device power configuration, power consumption and/or application information.

5. The method of claim 1, further comprising:
sending an authentication request from the host device to the accessory device;
receiving a response to the authentication request from the accessory device; and
attempting to authenticate the accessory device at the host device, wherein the instructing the accessory device to configure the one or more pins of the accessory device connector is performed when the accessory device has been authenticated.

6. The method of claim 1, further comprising:
determining or receiving an indication that at least one of the one or more host device licenses has expired or been revoked; and
disabling at least one of the one or more functions enabled at the host device connector in response to the determining or receiving an indication that at least one of the one or more host device licenses has expired or been revoked.

7. The method of claim 1, further comprising:
invoking an accessory-specific user interface or user experience on the host device or the accessory device.

8. A method of configuring a connector of an accessory device for connecting to a connector of a host device, comprising:
sending accessory device information to the host device, the accessory device releasably attached to the host device;
receiving an instruction from the host device to configure one or more pins of the accessory device connector to support one or more functions selected by the host device for connecting the accessory device to the host device, wherein the one or more functions are selected based in part on one or more host device licenses;
configuring the one or more pins of the accessory device connector, the configuring comprising enabling the one or more functions selected by the host device at the accessory device connector;

determining or receiving an indication that a host device license, of the one or more host device licenses, has been renewed or upgraded or that a new host device license is available;

sending an instruction to the host device that one or more second selected functions are available based in part on the renewed, upgraded or new host device license;

receiving an instruction from the host device to configure one or more pins of the accessory device connector to support the one or more second selected functions; and configuring the one or more pins of the of the accessory device connector to support the one or more second selected functions.

9. The method of claim 8, wherein the accessory device information comprises accessory device power configuration, power consumption and/or application information.

10. The method of claim 8, wherein the accessory device information comprises an indication of one or more functions supported by the accessory device connector.

11. The method of claim 10, wherein the indicated one or more functions excludes at least one function supported by the accessory device connector.

12. The method of claim 11, further comprising:
determining the excluded at least one function based in part on accessory device power consumption, power configuration and/or application information.

13. The method of claim 12, further comprising:
determining or receiving an indication that at least one of the one or more host device licenses has expired or been revoked; and
disabling at least one of the one or more selected functions enabled at the accessory device connector in response to the determining or receiving an indication that at least one of the one or more host device licenses has expired or been revoked.

14. The method of claim 8, further comprising:
receiving host device information;
authenticating the host device; and
selecting one or more functions supported by the accessory device connector, wherein the accessory device information sent to the host device comprises the indication of the selected one or more functions supported by the accessory device connector.

15. The method of claim 8, wherein the accessory device information sent to the host device comprises accessory device metadata.

16. A host device comprising:
a controller; and
one or more computer-readable storage media storing computer-executable instructions for causing the host device to perform a method, the method comprising;
receiving accessory device information from an accessory device releasably attached to the host device;
selecting, based in part on the accessory device information, one or more functions to be enabled for connecting the host device to the accessory device, wherein the selecting one or more functions is further based in part on one or more host device licenses;
configuring one or more pins of a connector of the host device, the configuring comprising enabling the selected one or more functions at the connector of the host device;
instructing the accessory device to configure one or more pins of a connector of the accessory device to support the selected one or more functions;

determining or receiving an indication that a host device license, of the one or more host device licenses, has been renewed or upgraded or that a new host device license is available;

selecting one or more second functions to be enabled for connecting the host device to the accessory device based in part on the renewed, upgraded or new host device license;

configuring one or more pins of the connector of the host device, the configuring comprising enabling the one or more second selected functions at the connector of the host device; and instructing the accessory device to configure one or more pins of the accessory device connector to support the one or more second selected functions.

17. A host device of claim 16, the method further comprising operating the host device and the accessory device in conformance with the one or more host device licenses.

18. A host device of claim 16, wherein the method further comprises:

authenticating the accessory device.

* * * * *